(12) United States Patent
Kim et al.

(10) Patent No.: US 11,466,925 B2
(45) Date of Patent: Oct. 11, 2022

(54) VACUUM ADIABATIC BODY AND REFRIGERATOR

(71) Applicant: LG ELECTRONICS INC., Seoul (KR)

(72) Inventors: Daewoong Kim, Seoul (KR); Hyeunsik Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 16/637,861

(22) PCT Filed: Jul. 31, 2018

(86) PCT No.: PCT/KR2018/008700
§ 371 (c)(1),
(2) Date: Feb. 10, 2020

(87) PCT Pub. No.: WO2019/035577
PCT Pub. Date: Feb. 21, 2019

(65) Prior Publication Data
US 2020/0248955 A1  Aug. 6, 2020

(30) Foreign Application Priority Data

Aug. 16, 2017 (KR) .......... 10-2017-0103444

(51) Int. Cl.
*F25D 23/06* (2006.01)
*F16L 59/065* (2006.01)
(Continued)

(52) U.S. Cl.
CPC .......... *F25D 23/065* (2013.01); *F16L 59/065* (2013.01); *F25B 39/00* (2013.01);
(Continued)

(58) Field of Classification Search
CPC ...... F25D 23/065; F25D 16/00; F25D 17/065; F25D 17/045; F25D 19/00; F25D 23/02;
(Continued)

(56) References Cited

U.S. PATENT DOCUMENTS 1,420,711 A  6/1922  Knutson
1,814,114 A  7/1931  Bodman
(Continued)

FOREIGN PATENT DOCUMENTS

CN  2066123  11/1990
CN  1056276  11/1991
(Continued)

OTHER PUBLICATIONS

U.S. Office Action dated May 3, 2021 issued in U.S. Appl. No. 16/635,793.
(Continued)

*Primary Examiner* — Hanh V Tran
(74) *Attorney, Agent, or Firm* — KED & Associates

(57) ABSTRACT

A vacuum adiabatic body and a refrigerator are provided. The vacuum adiabatic body includes a support that maintains a vacuum space between a first plate and a second plate. The support includes a first support plate provided by coupling at least two partial plates to support one of the first plate or the second plate, and a second support plate that supports the other one of the first plate or the second plate.

23 Claims, 20 Drawing Sheets

(51) Int. Cl.
*F25D 16/00* (2006.01)
*F25B 39/00* (2006.01)
*F25D 19/00* (2006.01)
*F25D 23/02* (2006.01)
*F25D 17/04* (2006.01)
*F25D 17/06* (2006.01)

(52) U.S. Cl.
CPC ............ *F25D 16/00* (2013.01); *F25D 17/045* (2013.01); *F25D 17/065* (2013.01); *F25D 19/00* (2013.01); *F25D 23/02* (2013.01); *F25D 23/064* (2013.01); *F25D 2201/14* (2013.01)

(58) Field of Classification Search
CPC .... F25D 23/064; F25D 2201/14; F25D 23/06; F25B 39/00; F16L 59/065; F16L 59/02
See application file for complete search history.

(56) References Cited

U.S. PATENT DOCUMENTS

| | | | |
|---|---|---|---|
| 1,845,353 A | 2/1932 | Snell | |
| 2,000,882 A * | 5/1935 | Comstock | F25D 23/062 220/592.27 |
| 2,065,608 A | 12/1936 | Munters | |
| 2,464,526 A | 3/1949 | Palmer | |
| 2,989,156 A * | 6/1961 | Brooks | F25D 23/06 52/788.1 |
| 3,156,975 A | 11/1964 | Shaw | |
| 3,161,265 A | 12/1964 | Matsch et al. | |
| 3,338,451 A | 8/1967 | Kesling | |
| 3,936,553 A * | 2/1976 | Rowe | E04B 1/806 428/81 |
| 4,545,211 A | 10/1985 | Gaus | |
| 4,545,213 A | 10/1985 | Fujiwara et al. | |
| 4,705,099 A | 11/1987 | Taniguchi et al. | |
| 4,732,432 A | 3/1988 | Keil | |
| 4,826,040 A | 5/1989 | Jahr, Jr. et al. | |
| 4,837,388 A | 6/1989 | Kugelmann | |
| 5,011,729 A * | 4/1991 | McAllister | E04B 1/803 428/167 |
| 5,157,893 A | 10/1992 | Benson et al. | |
| 5,500,305 A | 3/1996 | Bridges | |
| 5,720,536 A | 2/1998 | Jenkins et al. | |
| 5,860,594 A | 1/1999 | Reason et al. | |
| 6,038,830 A | 3/2000 | Hirath et al. | |
| 6,393,798 B1 | 5/2002 | Hirath et al. | |
| 6,769,265 B1 | 8/2004 | Davis | |
| 7,571,582 B2 | 8/2009 | Hirai et al. | |
| 7,891,203 B1 | 2/2011 | Burns et al. | |
| 8,752,921 B2 | 6/2014 | Görz et al. | |
| 8,765,247 B2 | 7/2014 | Park | |
| 8,822,006 B2 | 9/2014 | Yoon et al. | |
| 9,170,046 B2 | 10/2015 | Jung | |
| 10,274,247 B2 * | 4/2019 | Jeong | F25D 23/067 |
| 10,337,788 B2 | 7/2019 | Jung et al. | |
| 10,543,560 B2 | 1/2020 | Nakakura et al. | |
| 10,639,743 B2 | 5/2020 | Azuma et al. | |
| 10,753,669 B2 | 8/2020 | Dherde et al. | |
| 10,760,849 B2 * | 9/2020 | Jung | F25D 23/082 |
| 10,837,696 B2 * | 11/2020 | Jung | F16L 59/065 |
| 10,899,264 B2 | 1/2021 | Jung et al. | |
| 10,907,887 B2 * | 2/2021 | Jung | F25D 23/06 |
| 10,913,232 B2 * | 2/2021 | Dye | B64G 1/546 |
| 10,941,974 B2 * | 3/2021 | Jung | F25D 23/02 |
| 11,047,616 B2 * | 6/2021 | Jeong | F25D 23/061 |
| 2002/0041134 A1 | 4/2002 | Wolf et al. | |
| 2004/0080122 A1 | 4/2004 | Beyrle | |
| 2004/0226956 A1 | 11/2004 | Brooks | |
| 2005/0053755 A1 | 3/2005 | Markey | |
| 2010/0071384 A1 | 3/2010 | Lu | |
| 2010/0251653 A1 | 10/2010 | Mills | |
| 2010/0252698 A1 * | 10/2010 | Dye | F16L 59/065 248/177.1 |
| 2011/0204065 A1 | 8/2011 | Kolowich | |
| 2011/0241513 A1 | 10/2011 | Nomura | |
| 2012/0103006 A1 | 5/2012 | Jung et al. | |
| 2012/0104923 A1 * | 5/2012 | Jung | F25D 23/066 312/406 |
| 2012/0128920 A1 * | 5/2012 | Yoon | F16L 59/065 428/69 |
| 2012/0196059 A1 | 8/2012 | Fujimori | |
| 2013/0105494 A1 * | 5/2013 | Jung | F25D 23/062 220/592.05 |
| 2013/0105495 A1 * | 5/2013 | Jung | F25D 23/062 220/592.05 |
| 2013/0111942 A1 * | 5/2013 | Jung | F25B 40/00 62/440 |
| 2013/0200084 A1 | 8/2013 | Jung et al. | |
| 2013/0230684 A1 | 9/2013 | Shinoki et al. | |
| 2014/0322481 A1 | 10/2014 | Song et al. | |
| 2015/0044412 A1 | 2/2015 | Miyaji et al. | |
| 2016/0109172 A1 * | 4/2016 | Kim | F25D 23/065 312/404 |
| 2016/0258671 A1 | 9/2016 | Allard et al. | |
| 2018/0017314 A1 | 1/2018 | Jeong et al. | |
| 2018/0216872 A1 | 8/2018 | Jung et al. | |
| 2018/0216873 A1 | 8/2018 | Jung et al. | |
| 2018/0224052 A1 | 8/2018 | Jung et al. | |
| 2018/0224193 A1 | 8/2018 | Jung et al. | |
| 2018/0224194 A1 | 8/2018 | Jung et al. | |
| 2018/0224195 A1 | 8/2018 | Jung et al. | |
| 2018/0224196 A1 | 8/2018 | Jung et al. | |
| 2018/0224197 A1 | 8/2018 | Jung et al. | |
| 2018/0224198 A1 | 8/2018 | Jung et al. | |
| 2018/0231298 A1 | 8/2018 | Jung et al. | |
| 2018/0231300 A1 | 8/2018 | Jung et al. | |
| 2018/0238486 A1 | 8/2018 | Jung et al. | |
| 2018/0238610 A1 | 8/2018 | Jung et al. | |
| 2018/0356147 A1 | 12/2018 | Jung et al. | |
| 2019/0255980 A1 | 8/2019 | Jung et al. | |
| 2020/0182393 A1 * | 6/2020 | Jung | F25D 23/068 |
| 2021/0140704 A1 * | 5/2021 | Kim | F25D 23/06 |

FOREIGN PATENT DOCUMENTS

| | | |
|---|---|---|
| CN | 1276055 | 12/2000 |
| CN | 1276056 | 12/2000 |
| CN | 2691933 | 4/2005 |
| CN | 2720362 | 8/2005 |
| CN | 102121781 | 7/2011 |
| CN | 102455103 | 5/2012 |
| CN | 102455105 | 5/2012 |
| CN | 103090616 | 5/2013 |
| CN | 104204646 | 12/2014 |
| CN | 104296490 | 1/2015 |
| CN | 104457117 | 3/2015 |
| CN | 104482707 | 4/2015 |
| CN | 104833157 | 8/2015 |
| CN | 104913571 | 9/2015 |
| CN | 205350719 | 6/2016 |
| CN | 106016957 | 10/2016 |
| CN | 205784134 | 12/2016 |
| CN | 106500428 | 3/2017 |
| CN | 106766594 | 5/2017 |
| CN | 107257907 | 10/2017 |
| CN | 107923701 | 4/2018 |
| CN | 208281706 | 12/2018 |
| CN | 208472996 | 2/2019 |
| CN | 109403210 | 3/2019 |
| DE | 10 2011 050472 | 11/2011 |
| EP | 1 564 513 | 8/2005 |
| EP | 2462372 | 10/2016 |
| GB | 890372 | 2/1962 |
| JP | S 60-179344 | 9/1985 |
| JP | 01-142379 | 6/1989 |
| JP | 01-179882 | 7/1989 |
| JP | H05-9298 | 2/1993 |
| JP | H07-091591 | 4/1995 |
| JP | 2001-277396 | 10/2001 |
| JP | 2002-071088 | 3/2002 |
| JP | 2002-221295 | 8/2002 |
| JP | 2003-042388 | 2/2003 |

(56) References Cited

FOREIGN PATENT DOCUMENTS

| | | |
|---|---|---|
| JP | 2004-211376 | 7/2004 |
| JP | 2006-082604 | 3/2006 |
| JP | 10-2010-0109653 | 10/2010 |
| JP | 2012-021615 | 2/2012 |
| JP | 2012-207682 | 10/2012 |
| JP | 2013-007439 | 1/2013 |
| JP | 2013-189996 | 9/2013 |
| JP | 5316672 | 10/2013 |
| JP | 2014-051993 | 3/2014 |
| KR | 10-2001-0073363 | 8/2001 |
| KR | 10-0343719 | 7/2002 |
| KR | 10-0363646 | 11/2002 |
| KR | 20-0303619 | 2/2003 |
| KR | 10-2004-0002175 | 1/2004 |
| KR | 10-2004-0042682 | 5/2004 |
| KR | 10-2007-0037274 | 4/2007 |
| KR | 10-0845153 | 7/2008 |
| KR | 10-2008-0079498 | 9/2008 |
| KR | 10-2010-0099629 | 9/2010 |
| KR | 10-2011-0015327 | 2/2011 |
| KR | 10-2011-0113414 | 11/2011 |
| KR | 10-2012-0139648 | 12/2012 |
| KR | 10-2013-0084561 | 7/2013 |
| KR | 10-1456376 | 10/2014 |
| KR | 10-2015-0012712 | 2/2015 |
| KR | 10-2015-0109727 | 8/2015 |
| KR | 10-2016-0079278 | 7/2016 |
| KR | 20-2017-0000187 | 1/2017 |
| KR | 10-2017-0016190 | 2/2017 |
| KR | 10-2017-0016244 | 2/2017 |
| KR | 10-2017-0071623 | 6/2017 |
| KR | 10-2018-0095281 | 8/2018 |
| RU | 2073285 | 2/1997 |
| RU | 2252377 | 5/2005 |
| RU | 2496063 | 10/2013 |
| RU | 2553251 | 6/2015 |
| RU | 2608791 | 1/2017 |
| RU | 2 627 067 | 8/2017 |
| WO | WO 91/19867 | 12/1991 |
| WO | WO 01/04553 | 1/2001 |
| WO | WO 02/069673 | 9/2002 |
| WO | WO 2012/176880 | 12/2012 |
| WO | WO 2016/105019 | 6/2016 |
| WO | WO-2016105019 A1 * 6/2016 ............ F25D 23/06 |
| WO | WO 2017/023072 | 2/2017 |
| WO | WO 2017/023073 | 2/2017 |
| WO | WO 2017/023075 | 2/2017 |
| WO | WO 2017/023076 | 2/2017 |
| WO | WO 2017/023077 | 2/2017 |
| WO | WO 2017/023087 | 2/2017 |
| WO | WO 2017/023088 | 2/2017 |
| WO | WO 2017/023089 | 2/2017 |
| WO | WO 2017/023090 | 2/2017 |
| WO | WO 2017/023094 | 2/2017 |
| WO | WO 2017/023095 | 2/2017 |
| WO | WO 2017/023097 | 2/2017 |
| WO | WO 2017/023100 | 2/2017 |
| WO | WO 2017/023102 | 2/2017 |
| WO | WO-2017023094 A1 * 2/2017 ............ F25D 23/06 |
| WO | WO 2017/105030 | 6/2017 |

OTHER PUBLICATIONS

International Search Report and Written Opinion dated Nov. 8, 2018 issued in Application No. PCT/KR2018/008687.
International Search Report and Written Opinion dated Nov. 21, 2018 issued in Application No. PCT/KR2018/008691.
International Search Report and Written Opinion dated Nov. 23, 2018 issued in Application No. PCT/KR2018/008689.
International Search Report and Written Opinion dated Nov. 23, 2018 issued in Application No. PCT/KR2018/008694.
International Search Report and Written Opinion dated Nov. 29, 2018 issued in Application No. PCT/KR2018/008698.
International Search Report and Written Opinion dated Dec. 18, 2018 issued in Application No. PCT/KR2018/008700.
European Search Report dated Mar. 24, 2021 issued in Application No. 18846385.5.
European Search Report dated Mar. 24, 2021 issued in Application No. 18840407.3.
Australian Examination Report dated Feb. 17, 2021 issued in Application No. 2018309544.
Chinese Office Action dated Dec. 9, 2020 issued in Application No. 201880050202.3.
Russian Office Action dated Jun. 22, 2020 issued in RU Application No. 2020108484.
European Search Report issued in Application No. 18840183.0 dated Mar. 29, 2021.
Chinese Office Action dated Feb. 1, 2021 issued in CN Application No. 201880050501.7.
Chinese Office Action dated Dec. 9, 2020 issued in CN Application No. 201880053044.7.
Chinese Office Action dated Dec. 2, 2020 issued in Application No. 201880050497.4.
Russian Office Action dated Feb. 20, 2021.
U.S. Office Action dated Jul. 7, 2021 issued in U.S. Appl. No. 16/635,729.
European Search Report issued in Application No. 18840899.1 dated Apr. 7, 2021.
Australian Office Action dated Feb. 11, 2021 issued in AU Application No. 2018309538.
European Search Report dated Mar. 24, 2021 issued in EP Application No. 18842051.7.
Russian Office Action dated Sep. 18, 2020 issued in Application No. 2020110370/12.
Australian Office Action dated Mar. 9, 2021 issued in AU Application No. 2018309541.
European Search Report dated Mar. 30, 2021 issued in EP Application No. 18840503.9.
Chinese Office Action dated Sep. 3, 2021 issued in CN Application No. 201880050572.7.
United States Office Action dated Oct. 29, 2021 issued in co-pending related U.S. Appl. No. 16/635,776.
U.S. Appl. No. 16/635,793, filed Jan. 31, 2020.
Chinese Office Action dated Sep. 28, 2021 issued in CN Application No. 201880050571.2.
Korean Office Action dated Dec. 21, 2021 issued in KR Application No. 10-2017-0097793.
Korean Office Action dated Dec. 21, 2021 issued in KR Application No. 10-2017-0097804.
Korean Office Action dated Dec. 24, 2021 issued in KR Application No. 10-2017-0097831.
U.S. Final Office Action dated Mar. 21, 2022 issued in U.S. Appl. No. 16/635,776.
U.S. Office Action issued in U.S. Appl. No. 16/635,758 dated Mar. 30, 2022.
U.S. Appl. No. 16/635,699, filed Jan. 31, 2020.
U.S. Appl. No. 16/635,729, filed Jan. 31, 2020.
U.S. Appl. No. 16/635,758, filed Jan. 31, 2020.
U.S. Appl. No. 16/635,776, filed Jan. 31, 2020.
U.S. Appl. No. 17/583,566, filed Jan. 25, 2022.
U.S. Appl. No. 16/637,861, filed Feb. 10, 2020.
Russian Office Action dated Mar. 9, 2022 issued in RU Application No. 2020142423.
Chinese Office Action dated Apr. 15, 2022 issued in CN Application No. 201880050571.2.
Chinese Office Action issued in Application No. 202110908473.1 dated Jul. 5, 2022.
Chinese Office Action issued in Application No. 202110909689.X dated Jul. 12, 2022.
Korean Office Action dated Jul. 23, 2022 issued in Application No. 10-2017-0103444.

\* cited by examiner

Fig. 4

| Group | | General plastic | | | | Engineering plastic | | | |
|---|---|---|---|---|---|---|---|---|---|
| Meaterial | | (HD)PE ※G-Plastic Reference | PC | Glass fiber PC (30% Glass-F) | ※Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | *151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength /Cond. | MPa-m-k/W | 79 | 460 | 689 | 448 | 189 | 357 | 420 | 552 |
| Heat Deflection Temp at 264 psi | ℃ | 80 | 132 | 146 | 125 | 126 | 121 | 105 ~ 260 | 160 |
| Max Operating Temperature | ℃ | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

VACUUM ADIABATIC BODY AND REFRIGERATOR

This application is a U.S. National Stage Application under 35 U.S.C. § 371 of PCT Application No. PCT/KR2018/008700, filed Jul. 31, 2018, which claims priority to Korean Patent Application No. 10-2017-0103444, filed Aug. 16, 2017, whose entire disclosures are hereby incorporated by reference.

BACKGROUND

1. Field

A vacuum adiabatic body and a refrigerator are disclosed herein.

2. Background

A vacuum adiabatic body is a product for suppressing heat transfer by vacuumizing an interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, an internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and an exterior of the vacuum adiabatic panel is finished with a separate molding as Styrofoam. According to the method, additional foaming is not required, and adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US2040226956A1 (Reference Document 3). However, it is difficult to obtain a practical level of an adiabatic effect by providing a wall of the refrigerator with sufficient vacuum. In detail, there are limitations in that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

The present applicant had filed Korean Patent Application No. 10-2015-0109727 in consideration of the above-described limitations. In the above document, a refrigerator including a vacuum adiabatic body is proposed. Particularly, a resin material that is adequate for a material for forming a supporting unit of the vacuum adiabatic body is proposed. Even in this document, there is a limitation that a shape of the supporting unit is different from that of the design, and it is difficult to manufacture and handle the supporting unit, and yield of the product is low.

Embodiments provide a vacuum adiabatic body, in which a shape of a supporting unit is maintained in a designed shape, and a refrigerator. Embodiments also provide a vacuum adiabatic body, which is easy in manufacturing and handling, and a refrigerator. Embodiments also provide a vacuum adiabatic body, in which defective factors occurring when a supporting unit is manufactured are reduced to improve yield of a product, and a refrigerator.

In order to allow a shape of a supporting unit provided in a vacuum adiabatic body to be maintained in a designed shape, the supporting unit may include one side support plate and the other side support plate, which respectively support plate members, and the one side support plate may be provided by coupling at least two plates to each other so that the member has a small size. In order to easily manufacture and handle the supporting unit, a partial plate may have a rectangular shape, and a female coupling structure and a male coupling structure may be provided on the edge of the partial plate.

In order to improve yield of the supporting unit, at least one of the one side support plate and the other side support plate may be provided by coupling at least two members having the same shape, which are separated from each other in an extension direction of the corresponding plate member. Also, a large-sized plate member may be cut to be used.

The details of one or more embodiments are set forth in the accompanying drawings and the description below. Other features will be apparent from the description and drawings, and from the claims.

According to embodiments, there may be an advantage that the shape of the supporting unit is manufactured correctly, and a finish and reliability of the product are improved. Also, parts may be shared to reduce stock. According to embodiments, small parts manufactured and transported to be assembled so as to manufacture a large-sized part, so that manufacturing and handling of the supporting unit are simple and easy. According to embodiments, it is possible to improve production yield of the supporting unit by applying the parts even if moldability, i.e., the resin having poor melt mobility is used. Further, even in the case of defective molding, only the parts need to be discarded, so that production yield of the supporting unit may be improved.

BRIEF DESCRIPTION OF DRAWINGS

FIG. 4 is a diagram illustrating results obtained by examining resins;

DETAILED DESCRIPTION

Hereinafter, exemplary embodiments will be described with reference to the accompanying drawings. The embodiments may, however, be embodied in many different forms and should not be construed as being limited to the embodiments set forth herein, and a person of ordinary skill in the art, who understands the spirit, may readily implement other embodiments included within the scope of the same concept by adding, changing, deleting, and adding components; rather, it will be understood that they are also included within the scope.

The drawings shown below may be displayed differently from the actual product, or exaggerated or simple or detailed parts may be deleted, but this is intended to facilitate understanding of the technical idea. It should not be construed as limited.

In the following description, the term vacuum pressure means any pressure state lower than atmospheric pressure. In addition, the expression that a vacuum degree of A is higher than that of B means that a vacuum pressure of A is lower than that of B.

Figure 1:
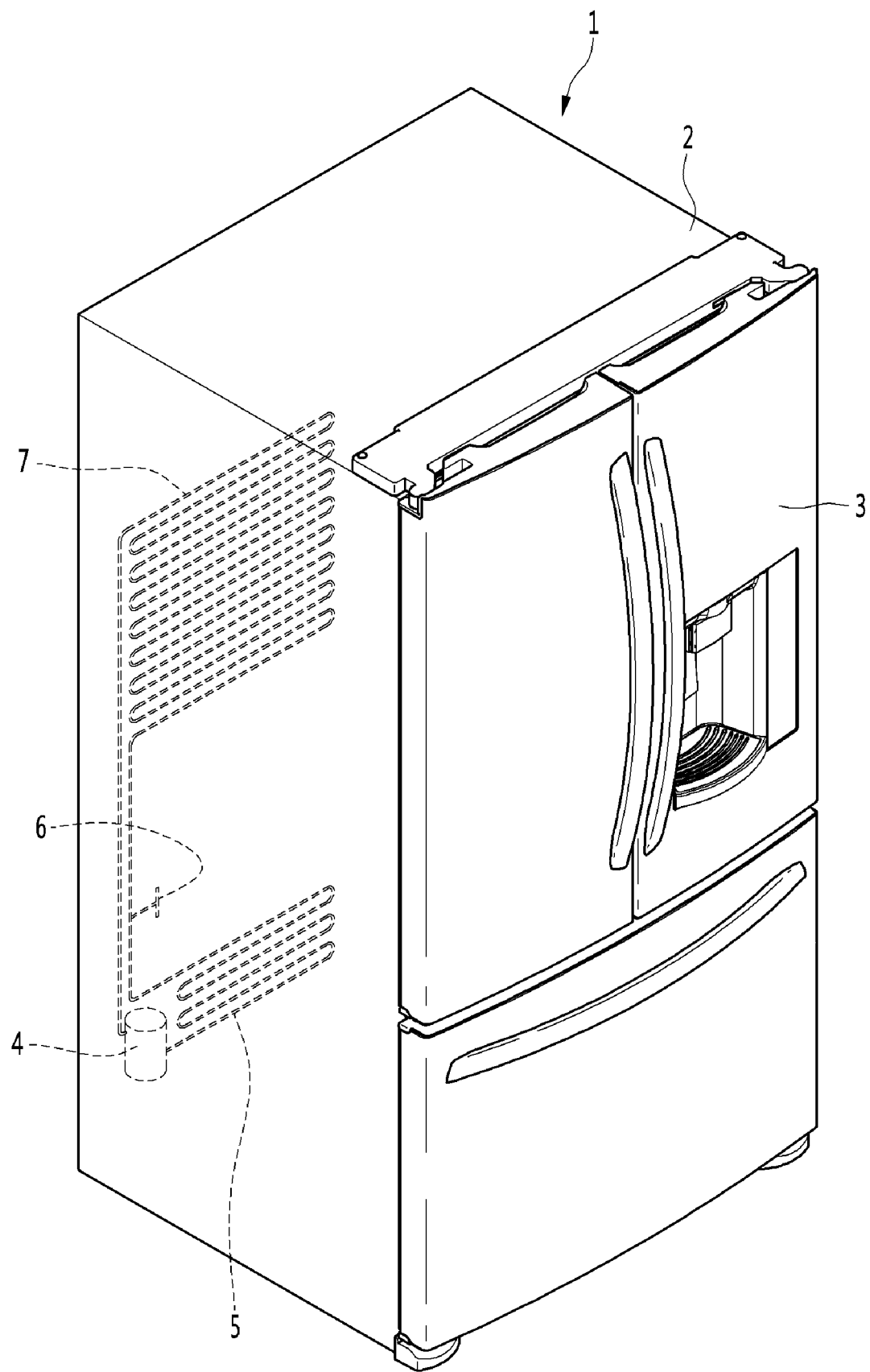
FIG. 1 is a perspective view of a refrigerator according to an embodiment.

FIG. 1 is a perspective view of a refrigerator according to an embodiment. Referring to FIG. 1, the refrigerator 1 includes a main body 2 provided with a cavity 9 capable of storing storage goods and a door 3 provided to open/close the main body 2. The door 3 may be rotatably or slidably movably disposed to open/close the cavity 9. The cavity 9 may provide at least one of a refrigerating compartment or a freezing compartment.

Parts constituting a freezing cycle in which cold air is supplied into the cavity 9. In detail, the parts include a compressor 4 that compresses a refrigerant, a condenser 5 that condenses the compressed refrigerant, an expander 6 that expands the condensed refrigerant, and an evaporator 7 that evaporates the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting a blowing amount and blowing direction by the fan, adjusting an amount of a circulated refrigerant, or adjusting a compression rate of the compressor, so that it is possible to control a refrigerating space or a freezing space. Other parts constituting the refrigeration cycle may be constituted by applying a member including a thermoelectric module.

Figure 2:
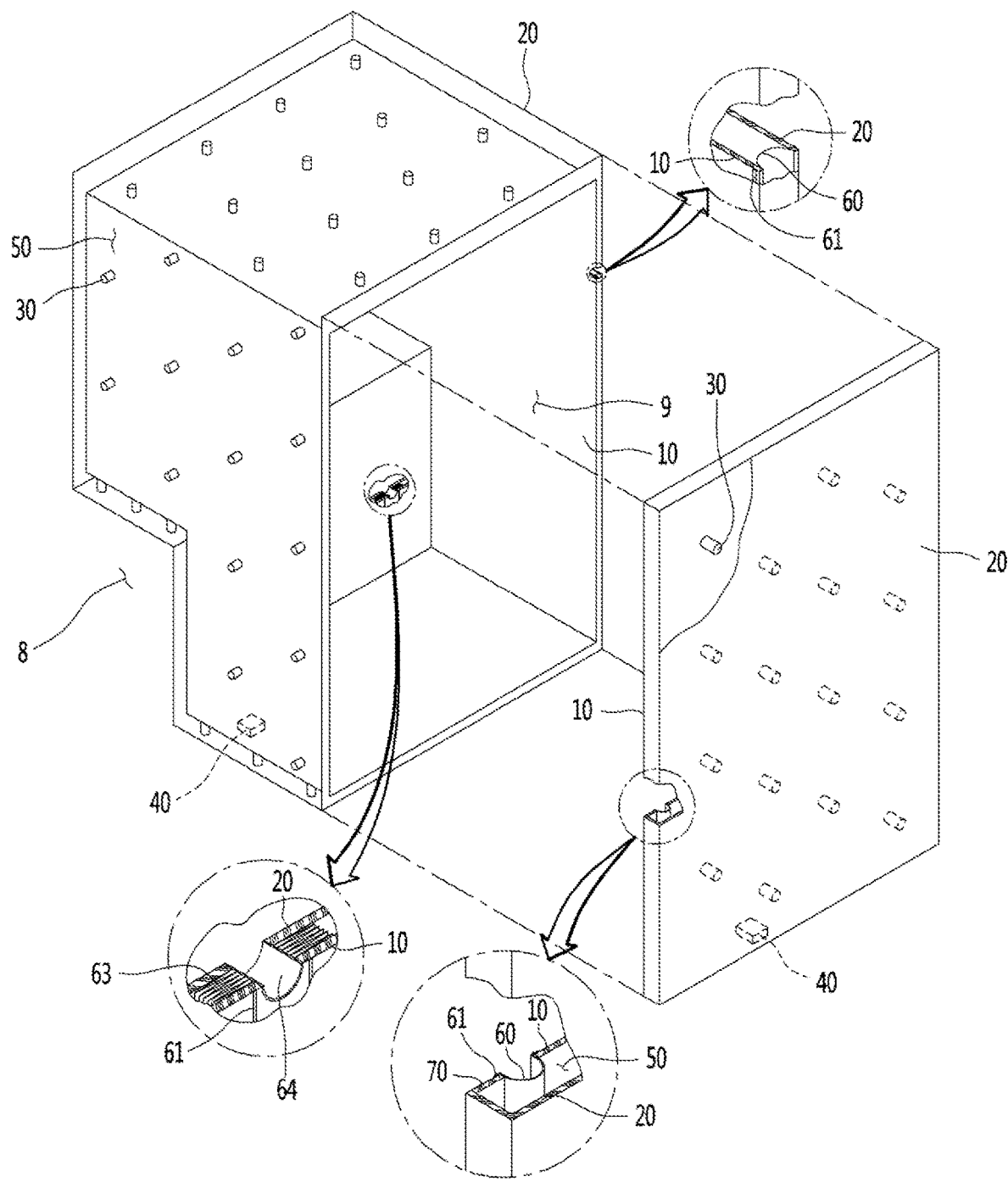
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member (first plate) 10 for providing a wall of a low-temperature space, a second plate member (second plate) 20 for providing a wall of a high-temperature space, a vacuum space part (vacuum space) 50 defined as an interval part between the first and second plate members 10 and 20. Also, the vacuum adiabatic body includes conductive resistance sheets 60 and 63 for preventing heat conduction between the first and second plate members 10 and 20. A sealing part (sealing) 61 for sealing the first and second plate members 10 and 20 is provided such that the vacuum space part 50 is in a sealed state. When the vacuum adiabatic body is applied to a refrigerator or a warming apparatus, the first plate member 10 providing a wall of an inner space of the refrigerator may be referred to as an inner case, and the second plate member 20 providing a wall of an outer space of the refrigerator may be referred to as an outer case.

A machine room 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. The wall for each space may serve as not only a wall directly contacting (facing) the space but also a wall not contacting (facing) the space. For example, the vacuum adiabatic body of the embodiment may also be applied to a product further having a separate wall contacting (facing) each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50. Hereinafter, a heat resistance unit provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming, for example, may be further provided to another side of the vacuum adiabatic body.

Figure 3A:
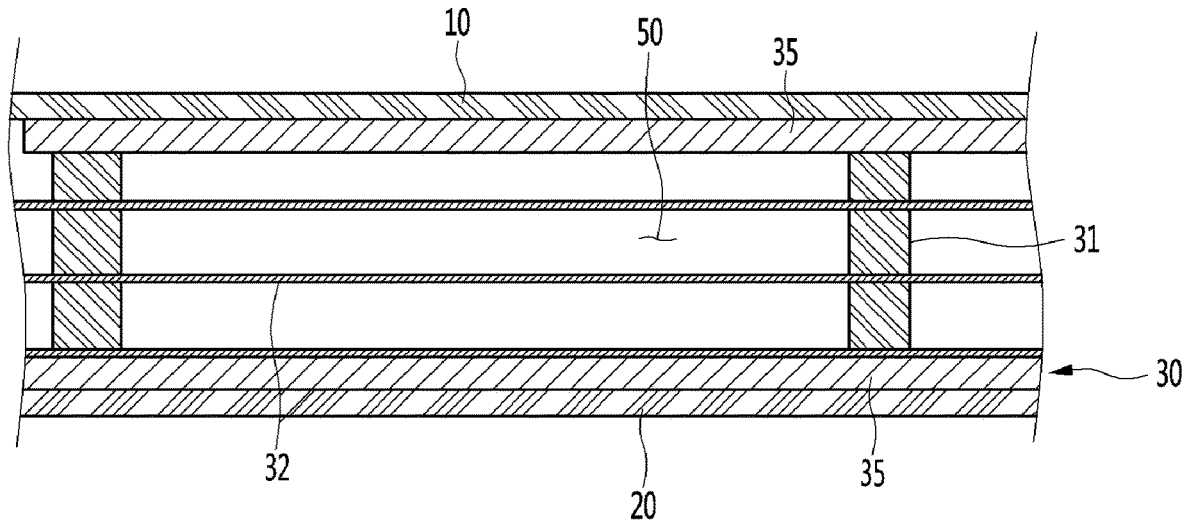
FIGS. 3A-3B are views illustrating various embodiments of an internal configuration of a vacuum space part.
Figure 3B:
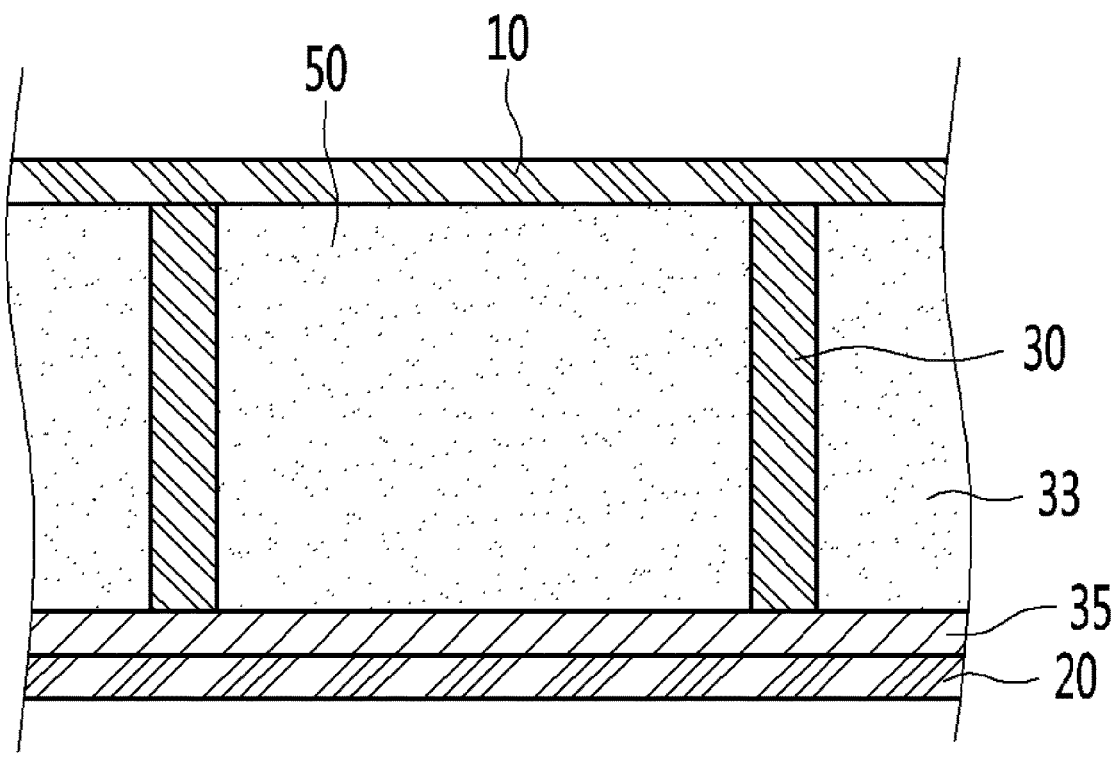

FIGS. 3A-3B are views illustrating various embodiments of an internal configuration of the vacuum space part. Referring to FIG. 3A, the vacuum space part 50 may be provided in a third space having a pressure different from that of each of the first and second spaces, for example, a vacuum state, thereby reducing adiabatic loss. The third space may be provided at a temperature between a temperature of the first space and a temperature of the second space. As the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of heat conduction, caused by contact between the plate members 10 and 20.

A supporting unit (support) 30 may be provided to reduce deformation of the vacuum space part 50. The supporting unit 30 includes a bar 31. The bar 31 may extend in a substantially vertical direction with respect to the plate members to support a distance between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on an extending direction of the bars 31, a total sectional area of the support plate 35 is provided to be greater than that of the bars 31, so that heat transferred through the bars 31 may be diffused through the support plate 35.

A material of the supporting unit 30 will be described hereinafter.

The supporting unit 30 is to have a high compressive strength so as to endure the vacuum pressure. Also, the supporting unit 30 is to have a low outgassing rate and a low water absorption rate so as to maintain the vacuum state. Further, the supporting unit 30 is to have a low thermal conductivity so as to reduce heat conduction between the plate members. Furthermore, the supporting unit 30 is to secure the compressive strength at a high temperature so as to endure a high-temperature exhaust process. Additionally, the supporting unit 30 is to have an excellent machinability so as to be subjected to molding. Also, the supporting unit 30 is to have a low cost for molding. A time required to perform the exhaust process takes about a few days. Hence, the time is reduced, thereby considerably improving fabrication cost and productivity. Therefore, the compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, the ceramic and glass may not be used as the material of the supporting unit 30. Therefore, resin may be considered as the material of the supporting unit 30.

FIG. 4 is a diagram illustrating results obtained by examining resins. Referring to FIG. 4, the present inventor has examined various resins, and most of the resins cannot be used because their outgassing rates and water absorption rates are remarkably high. Accordingly, the present inventor has examined resins that approximately satisfy conditions of the outgassing rate and the water absorption rate. As a result, polyethylene resin (PE) is inappropriate to be used due to its high outgassing rate and its low compressive strength. Polychlorotrifluoroethylene (PCTFE) is not used due to its remarkably high price. Polyether ether ketone (PEEK) is inappropriate to be used due to its high outgassing rate. Accordingly, it is determined that that a resin selected from the group consisting of polycarbonate (PC), glass fiber PC, low outgassing PC, polyphenylene sulfide (PPS), and liquid crystal polymer (LCP) may be used as the material of the supporting unit. However, an outgassing rate of the PC is 0.19, which is at a low level. Hence, as the time required to perform baking in which exhaustion is performed by applying heat is increased to a certain level, the PC may be used as the material of the supporting unit.

The present inventor has found an optimal material by performing various studies on resins expected to be used inside the vacuum space part. Hereinafter, results of the performed studies will be described with reference to the accompanying drawings.

Figure 5:
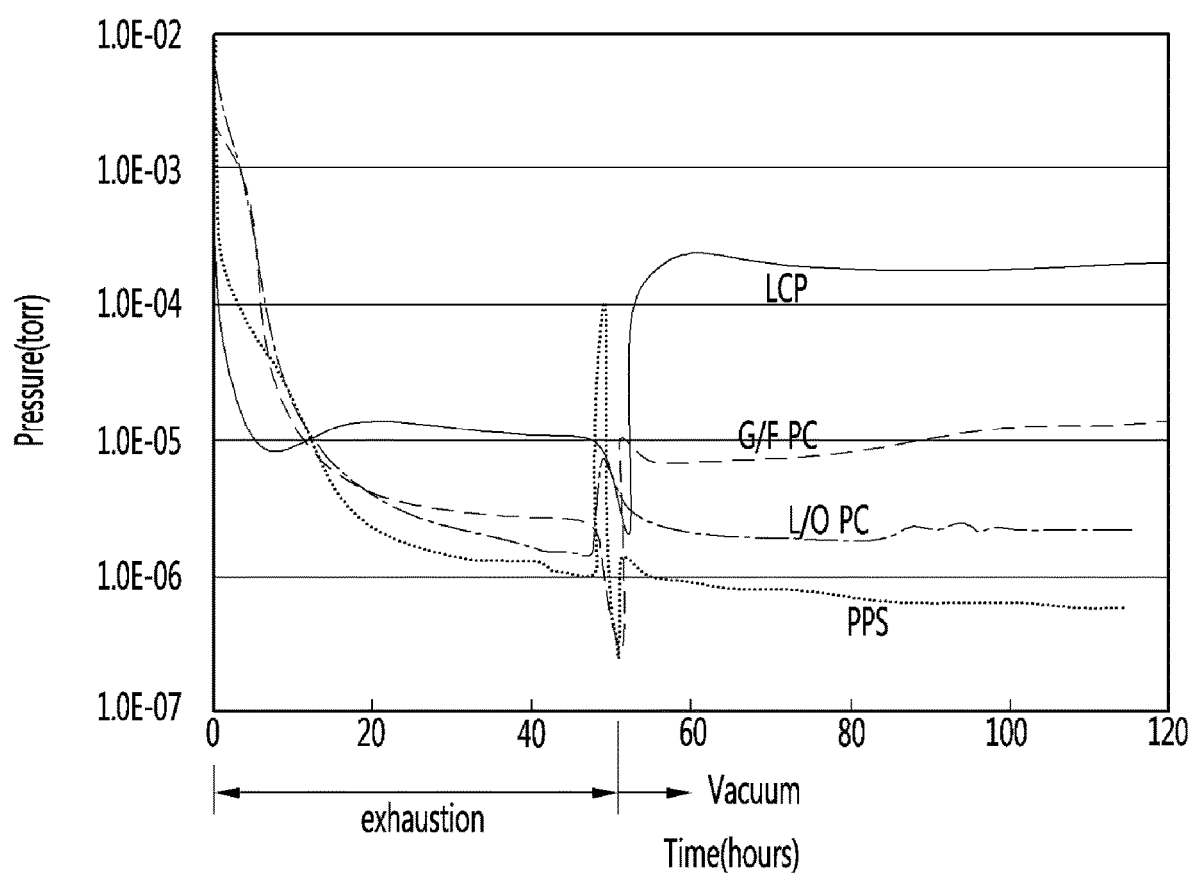
FIG. 5 illustrates results obtained by performing an experiment on vacuum maintenance performances of resins.

FIG. 5 is a view illustrating results obtained by performing an experiment on vacuum maintenance performances of the resins. Referring to FIG. 5, there is illustrated a graph showing results obtained by fabricating the supporting unit using the respective resins and then testing vacuum maintenance performances of the resins. First, a supporting unit fabricated using a selected material was cleaned using ethanol, left at a low pressure for 48 hours, exposed to air for 2.5 hours, and then subjected to an exhaust process at 90° C. for about 50 hours in a state that the supporting unit was put in the vacuum adiabatic body, thereby measuring a vacuum maintenance performance of the supporting unit.

It may be seen that in the case of the LCP, its initial exhaust performance is best, but its vacuum maintenance performance is bad. It may be expected that this is caused by sensitivity of the LCP to temperature. Also, it is expected through characteristics of the graph that, when a final allowable pressure is 5×10-3 Torr, its vacuum performance will be maintained for a time of about 0.5 year. Therefore, the LCP is inappropriate as the material of the supporting unit.

It may be seen that, in the case of the glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance will be maintained under the same condition for a time of about 8.2 years. Therefore, the LCP is inappropriate as the material of the supporting unit.

It is expected that, in the case of the low outgassing PC (L/O PC), its vacuum maintenance performance is excellent, and its vacuum performance will be maintained under the same condition for a time of about 34 years, as compared with the above-described two materials. However, it may be seen that the initial exhaust performance of the low outgassing PC is low, and therefore, fabrication efficiency of the low outgassing PC is lowered.

It may be seen that, in the case of the PPS, its vacuum maintenance performance is remarkably excellent, and its exhaust performance is also excellent. Therefore, it is considered that, based on the vacuum maintenance performance, the PPS is used as the material of the supporting unit.

Figure 6A:
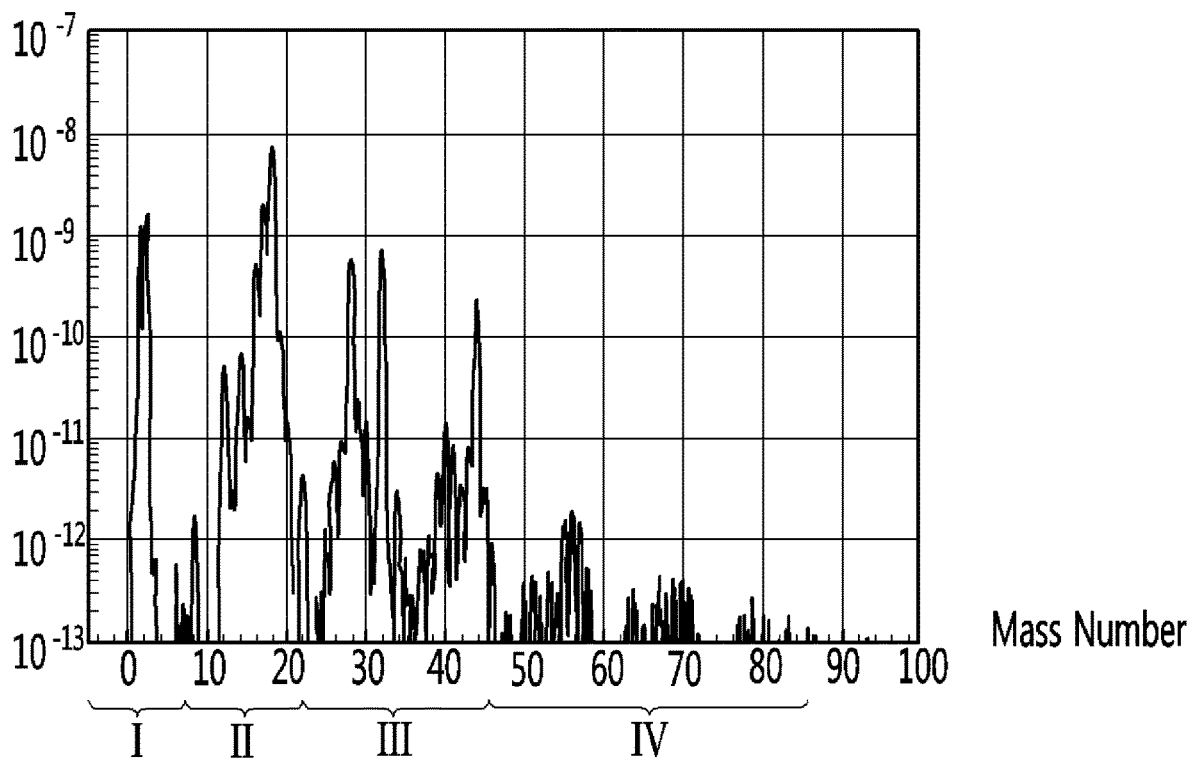
FIGS. 6A-6C are results obtained by analyzing components of gases discharged from polyphenylene sulfide (PPS) and low outgassing polycarbonate (PC)
Figure 6B:
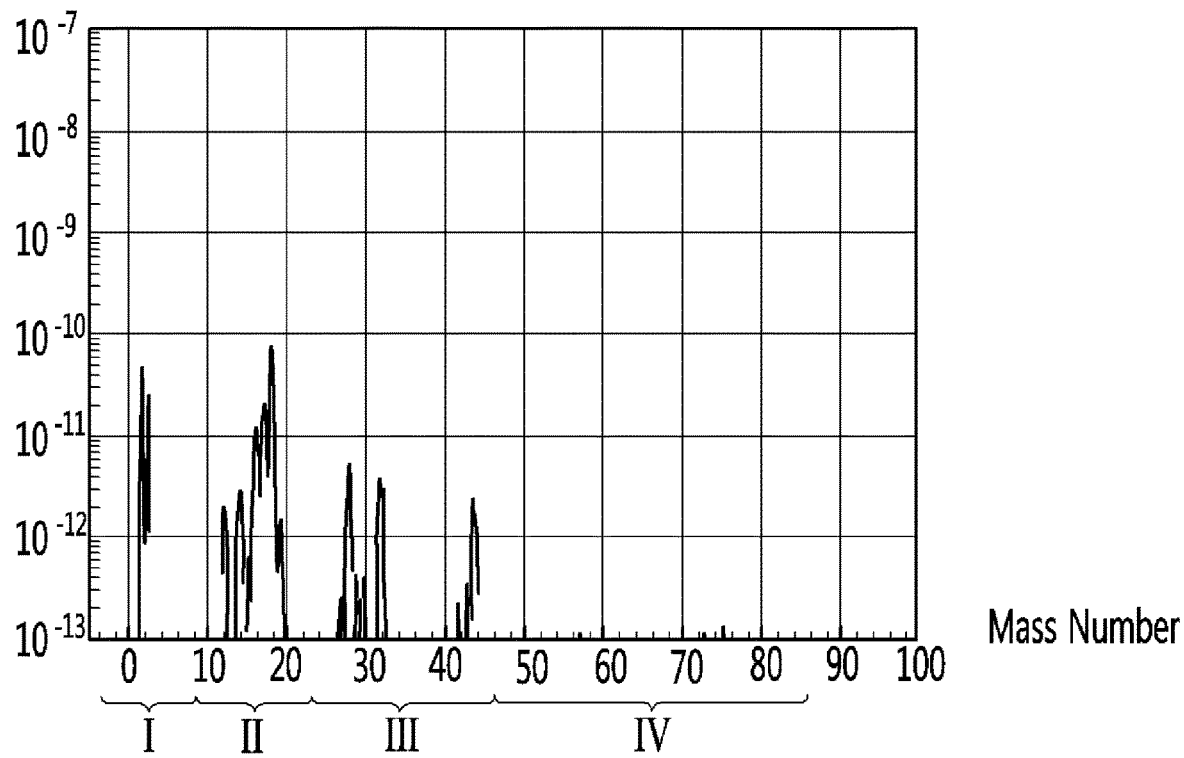
Figure 6C:
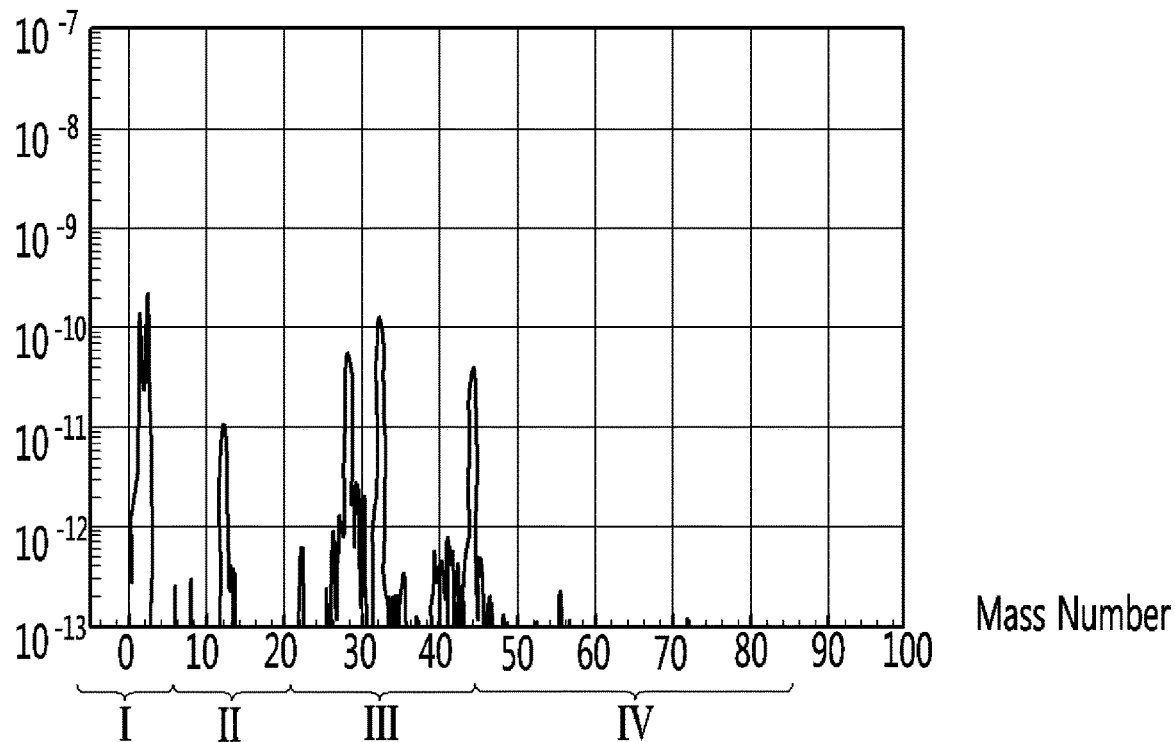

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that $H_2$ series (I), $H_2O$ series (II), $N_2/CO/CO_2/O_2$ series (III), and hydrocarbon series (IV) are equally discharged. FIG. 6B illustrates a result obtained by analyzing a gas discharged from the PPS. In FIG. 6B, it may be seen that $H_2$ series (I), $H_2O$ series (II), and $N_2/CO/CO_2/O_2$ series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel. As the analyzed result, it may be re-confirmed that the PPS is excellent as the material of the supporting unit.

Figure 7:
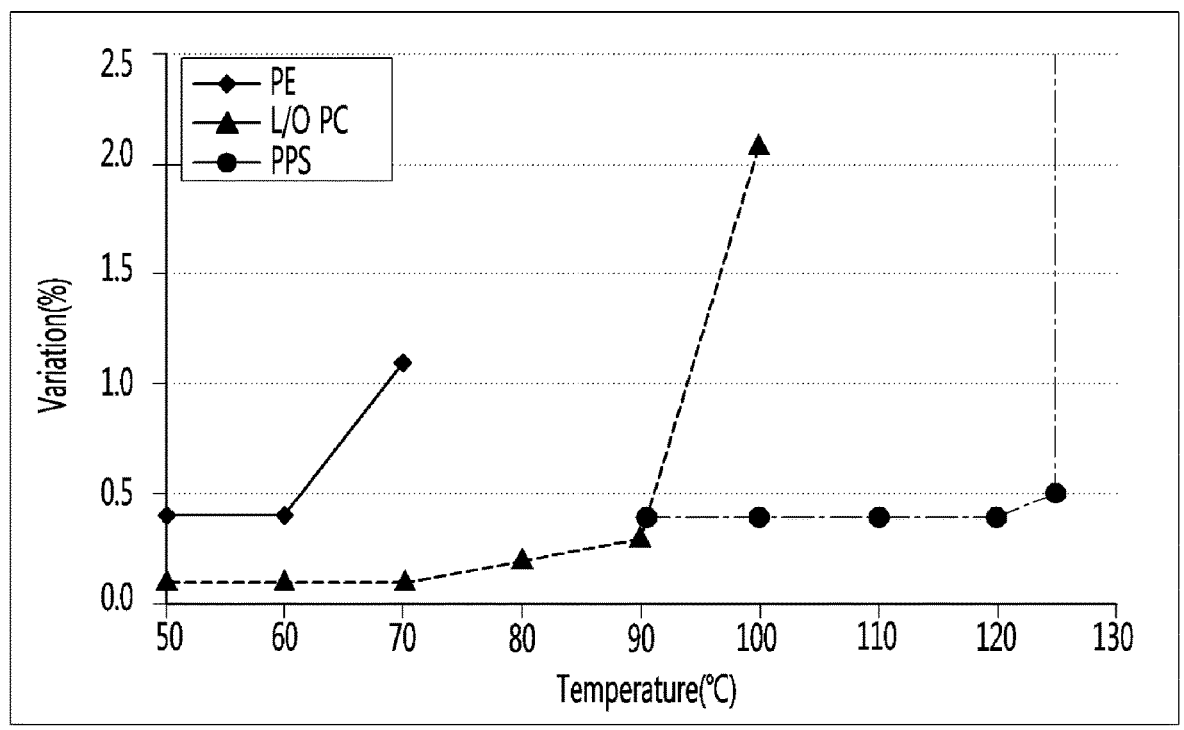
FIG. 7 illustrates results obtained by measuring maximum deformation temperatures at which resins are damaged by atmospheric pressure in high-temperature exhaustion.

FIG. 7 illustrates results obtained by measuring maximum deformation temperatures at which resins are damaged by atmospheric pressure in high-temperature exhaustion. The bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS. As the analyzed result, it may be seen that the PPS is most used as the resin used inside of the vacuum space part. However, the low outgassing PC may be used in terms of fabrication cost.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, as the transfer of radiation heat may not be sufficiently blocked using one radiation resistance sheet, at least two radiation resistance sheets 32 may be provided at a certain distance so as not to contact each other. Also, at least one radiation resistance sheet may be provided in a state in which it contacts the inner surface of the first or second plate member 10 or 20.

Referring back to FIG. 3B, a distance between the plate members is maintained by the supporting unit 30, and a porous material 33 may be filled in the vacuum space part 50. The porous material 33 may have a higher emissivity than the stainless material of the first and second plate members 10 and 20. However, as the porous material 33 is filled in the vacuum space part 50, the porous material 33 has a high efficiency for resisting the radiation heat transfer.

Figure 8A:
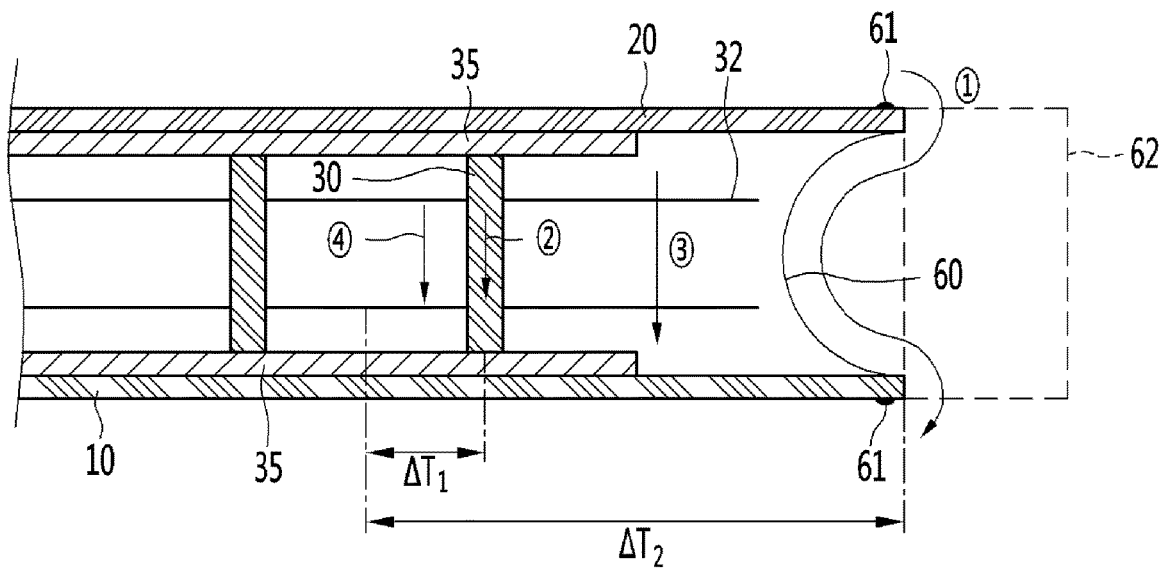
FIGS. 8A-8C are views showing various embodiments of conductive resistance sheets and peripheral parts thereof.
Figure 8B:
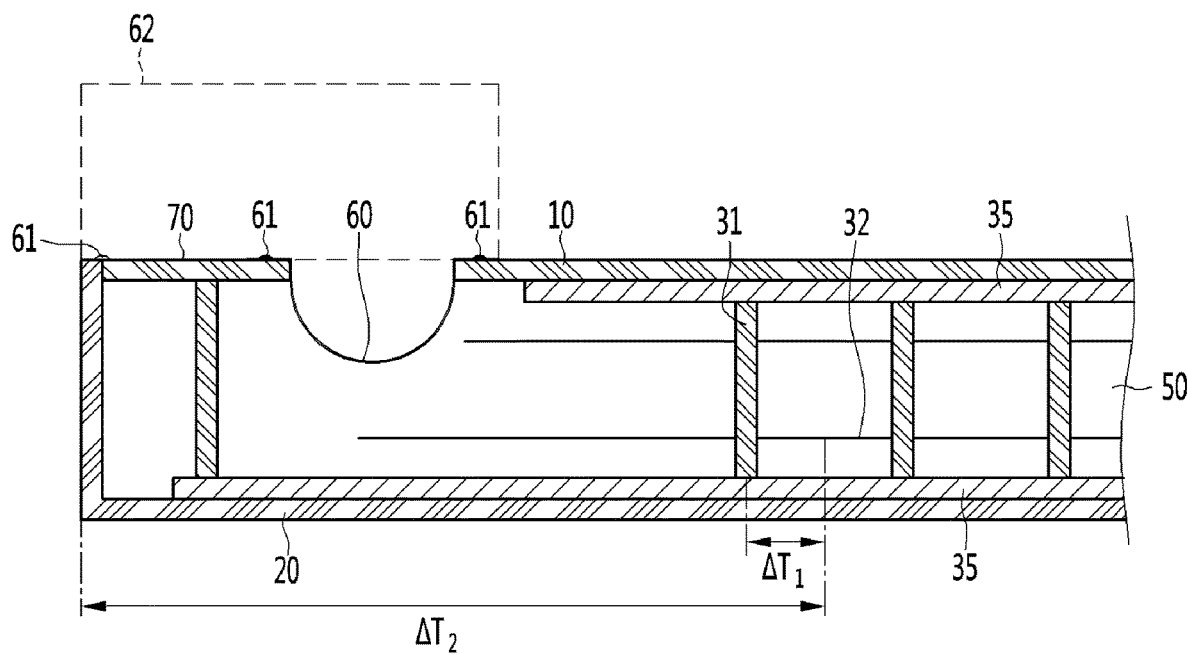
Figure 8C:
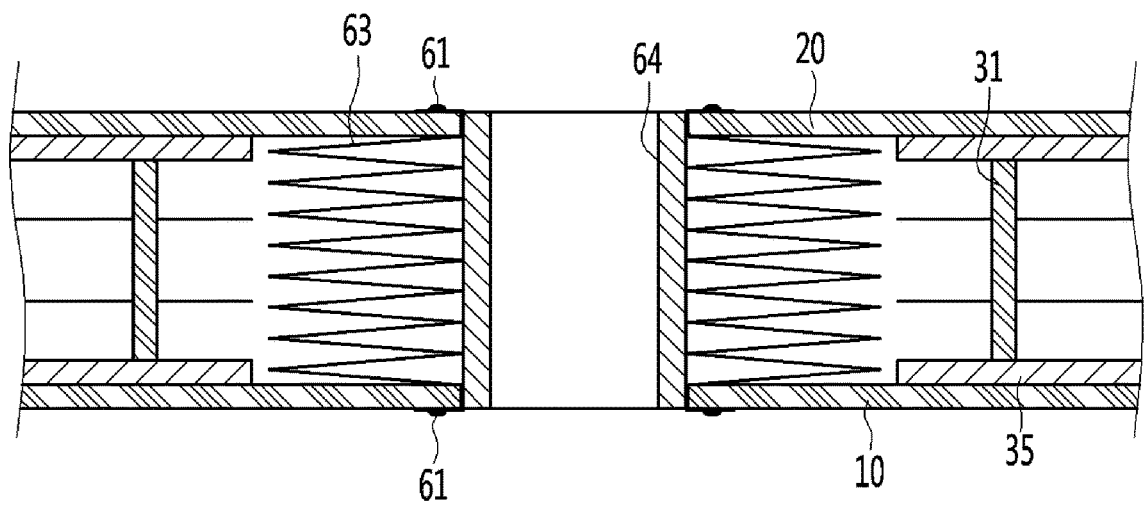

FIGS. 8A-8C are views showing various embodiments of conductive resistance sheets and peripheral parts thereof. Structures of the conductive resistance sheets are briefly illustrated in FIG. 2, but will be understood in detail with reference to the drawings.

First, a conductive resistance sheet proposed in FIG. 8A may be applied to the main body-side vacuum adiabatic body. Specifically, the first and second plate members 10 and 20 are to be sealed so as to vacuumize the interior of the vacuum adiabatic body. In this case, as the two plate members have different temperatures from each other, heat transfer may occur between the two plate members. Conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 610 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 610 are not limited to the welding parts, and may be provided through a process, such as cocking. The conductive resistance sheet 60 may be provided in a curved shape. Thus, a heat conduction distance of the conductive resistance sheet 60 is provided longer than a linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part (shield) 62 may be provided at an exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence, the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be provided as a porous material or a separate adiabatic structure.

A conductive resistance sheet proposed in FIG. 8B may be applied to the door-side vacuum adiabatic body. In FIG. 8B, portions different from those of FIG. 8A are described, and the same description is applied to portions identical to those of FIG. 8A. A side frame 70 is further provided at an outside of the conductive resistance sheet 60. A part for sealing between the door and the main body, an exhaust port necessary for an exhaust process, a getter port for vacuum maintenance, for example, may be placed on the side frame 70. This is because mounting of parts is convenient in the main body-side vacuum adiabatic body, but mounting positions of parts are limited in the door-side vacuum adiabatic body.

In the door-side vacuum adiabatic body, it is difficult to place the conductive resistance sheet 60 at a front end portion (front end) of the vacuum space part, i.e., a corner side portion (corner side) of the vacuum space part. This is because, unlike the main body, a corner edge portion (corner edge) of the door is exposed to the exterior. More specifically, if the conductive resistance sheet 60 is placed at the front end portion of the vacuum space part, the corner edge portion of the door is exposed to the exterior, and hence, there is a disadvantage in that a separate adiabatic part should be configured so as to heat-insulate the conductive resistance sheet 60.

A conductive resistance sheet proposed in FIG. 8C may be installed in the pipeline passing through the vacuum space part. In FIG. 8C, portions different from those of FIGS. 8A and 8B are described, and the same description is applied to portions identical to those of FIGS. 8A and 8B. A conductive resistance sheet having the same shape as that of FIG. 8A, a wrinkled conductive resistance sheet 63 may be provided at a peripheral portion of the pipeline 64. Accordingly, a heat transfer path may be lengthened, and deformation caused by a pressure difference may be prevented. In addition, a separate shielding part may be provided to improve adiabatic performance of the conductive resistance sheet.

A heat transfer path between the first and second plate members 10 and 20 will be described with reference back to FIG. 8A. Heat passing through the vacuum adiabatic body may be divided into surface conduction heat conducted along a surface of the vacuum adiabatic body, more specifically, the conductive resistance sheet 60, supporter conduction heat conducted along the supporting unit 30 provided inside of the vacuum adiabatic body, gas conduction heat conducted through an internal gas in the vacuum space part, and radiation transfer heat transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, a distance between the plate members may be changed, and a length of the conductive resistance sheet may be changed. The transfer heat may be changed depending on a difference in temperature between the spaces (the first and second spaces) respectively provided by the plate members.

In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat may become smallest. For example, the heat transfer amount by the gas conduction heat may be controlled to be equal to or smaller than 4% of the total heat transfer amount. A heat transfer amount by solid conduction heat defined as a sum of the surface conduction heat and the supporter conduction heat is largest. For example, the heat transfer amount by the solid conduction heat may reach 75% of the total heat transfer amount. A heat transfer amount by the radiation transfer heat is smaller than the heat transfer amount by the solid conduction heat but larger than the heat transfer amount of the gas conduction heat. For example, the heat transfer amount by the radiation transfer heat may occupy about 20% of the total heat transfer amount.

According to such a heat transfer distribution, effective heat transfer coefficients (eK: effective K) (W/mK) of the surface conduction heat, the supporter conduction heat, the gas conduction heat, and the radiation transfer heat may have an order of Math Equation 1.

$$eKsolid\ conduction\ heat > eKradiation\ transfer\ heat > eKgas\ conduction\ heat \qquad \text{[Equation 1]}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat, and the radiation transfer heat may be obtained by subtracting the surface conduction heat and the supporter conduction heat from the heat transfer amount of the entire vacuum adiabatic body. A ratio of the gas conduction heat, and the radiation transfer heat may be obtained by evaluating radiation transfer heat when no gas conduction heat exists by remarkably lowering a vacuum degree of the vacuum space part 50.

When a porous material is provided inside the vacuum space part 50, porous material conduction heat may be a sum of the supporter conduction heat and the radiation transfer heat. The porous material conduction heat may be changed depending on various variables including a kind, and an amount, for example, of the porous material.

According to an embodiment, a temperature difference $\Delta T1$ between a geometric center formed by adjacent bars 31 and a point at which each of the bars 31 is located may be provided to be less than 0.5° C. Also, a temperature difference $\Delta T2$ between the geometric center formed by the adjacent bars 31 and an edge portion of the vacuum adiabatic body may be provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be used.

Under such circumferences, the plate members 10 and 20 and the side frame 70 may be made of a material having a sufficient strength with which they are not damaged by even vacuum pressure. For example, when the number of bars 31 is decreased so as to limit support conduction heat, deformation of the plate member occurs due to the vacuum pressure, which may negatively influence the external appearance of refrigerator. The radiation resistance sheet 32 may be made of a material that has a low emissivity and may be easily subjected to thin film processing. Also, the radiation resistance sheet 32 is to ensure a sufficient strength not to be deformed by an external impact. The supporting unit 30 is provided with a strength sufficient so as to support the force of the vacuum pressure and endure an external impact, and is to have machinability. The conductive resistance sheet 60 may be made of a material that has a thin plate shape and may endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion (edge) of the radiation resistance sheet may generate conduction heat due to drooping caused by self-load of the radiation resistance sheet. Therefore, a stiffness of a certain level is required. The supporting unit 30 requires a stiffness enough to endure a compressive stress from the plate member and an external impact.

In an embodiment, the plate member and the side frame may have the highest stiffness so as to prevent deformation caused by the vacuum pressure. The supporting unit, particularly, the bar may have the second highest stiffness. The radiation resistance sheet may have a stiffness that is lower than that of the supporting unit but higher than that of the conductive resistance sheet. Lastly, the conductive resistance sheet may be made of a material that is easily deformed by the vacuum pressure and has the lowest stiffness. Even when the porous material 33 is filled in the vacuum space part 50, the conductive resistance sheet may have the lowest stiffness, and the plate member and the side frame may have the highest stiffness.

The vacuum space part 50 may resist heat transfer by only the supporting unit 30. A porous material 33 may be filled within the supporting unit 30 inside of the vacuum space part 50 to resist heat transfer. The heat transfer to the porous material 33 may resist without applying the supporting unit 30.

In the above description, as a material suitable for the supporting unit, a resin of PPS has been proposed. The bar 31 is provided on the support plate 35 at intervals of 2 cm to 3 cm, and the bar 31 has a height of 1 cm to 2 cm. These resins often have poor fluidity of the resin during molding. In many cases, the molded article does not have design value. Particularly, a shape of a molded product, such as a bar having a short length, is often not provided properly due to non-uniform injection of resin into a part far from a liquid injection port. This may cause damage to the supporting unit or a defective vacuum adiabatic body later.

The supporting unit 30 is a substantially two-dimensional structure, but its area is considerably large. Therefore, if a defect occurs in one of the portions, it is difficult to discard the entire structure. This limitation becomes even more pronounced as refrigerators and warming apparatus are becoming larger in size to meet the needs of consumers.

Hereinafter, a supporting unit for solving the above-described limitation will be described.

Figure 9:
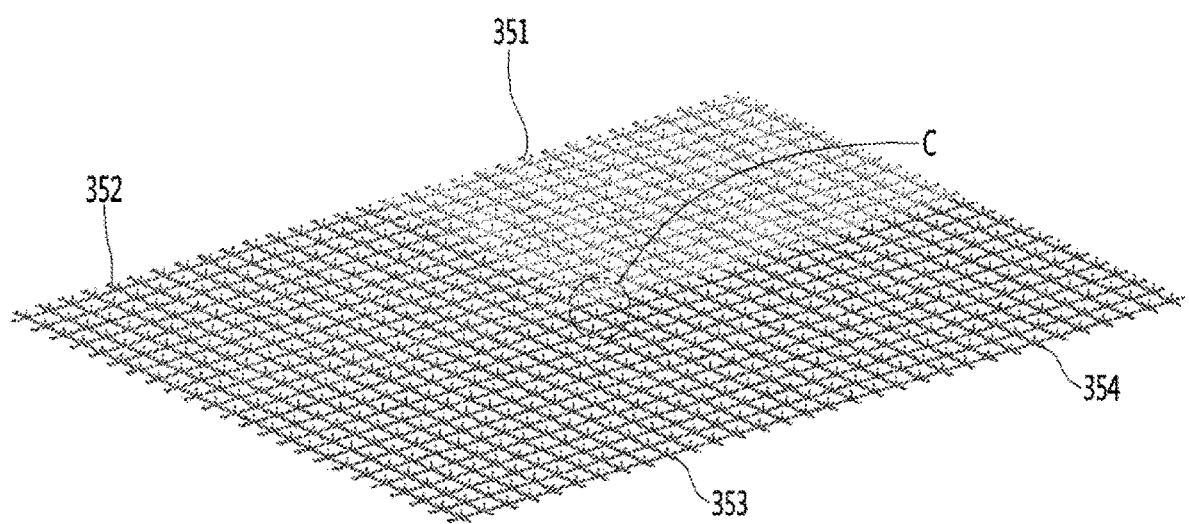
FIG. 9 is a view illustrating any one side portion of a supporting unit according an embodiment.

FIG. 9 is a view illustrating any one side portion of the supporting unit according an embodiment. Referring to FIG. 9, one (first) side support plate 350 is provided with at least two partial plates coupled to each other. In other words, partial plates having a small rectangular shape are coupled to each other to provide one side support plate 350 having a large rectangular shape. For example, in the drawings, a second partial plate 352 and a fourth partial plate 354 are coupled to lower and right sides of a first partial plate 351. The second partial plate 352 and the fourth partial plate 354 are coupled to left and upper sides of a third partial plate 353.

In an embodiment, the partial plates may have a same shape. Thus, a size of one side support plate 350 may reach four times the size of the partial plate. When varying the number of partial plates 351, 352, 353 and 354, which have the same shape and structure to be coupled to each other, the size of the one side support plate 350 may be changed. It is easily guessed that the size of the one side support plate 350 is differently provided depending on a size of the vacuum adiabatic body.

According to this configuration, the partial plate may be manufactured using resin having a poor fluidity when the partial plate is a liquid such as PPS, and the partial plate may be coupled. As the partial plate is small in size, defects may be prevented during molding, and even if a molding failure occurs, only the corresponding partial plate is discarded, so that it is not necessary to discard the whole support plate.

After producing the small partial plate, it is assembled at an assembly site of the vacuum adiabatic body and then put into the vacuum adiabatic body. Thus, there is an advantage that handling and transportation are convenient. In addition, it may be possible to prevent damage which may occur during handling of the large parts.

A plurality of small partial plates may be produced, and various types of supporting units having a desired area may be obtained.

Figure 10:
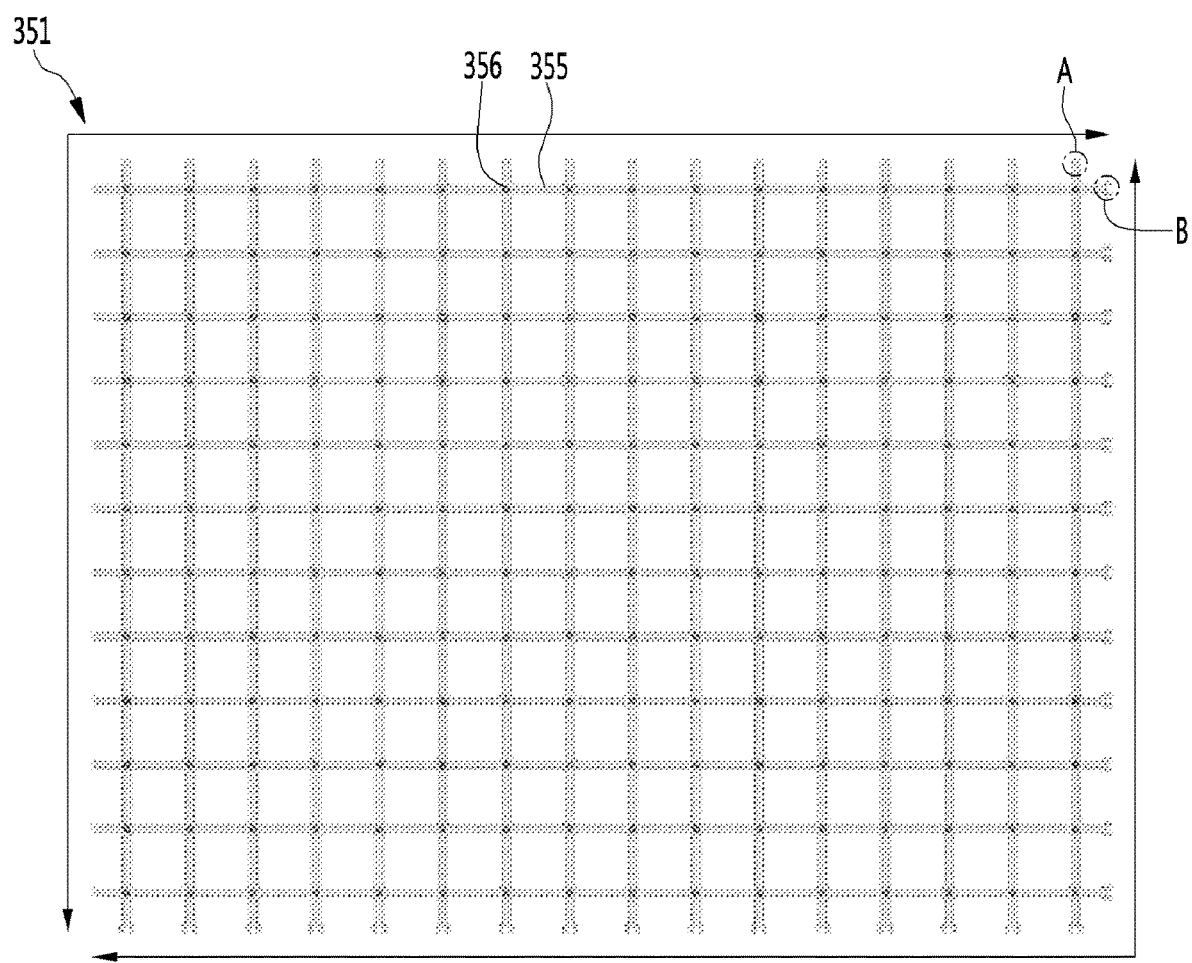
FIG. 10 is a plan view of a partial plate.

FIG. 10 is a plan view of the partial plate. Referring to FIG. 10, the partial plate 351 has one side base (base) 355 of a lattice structure, and a column 356 provided at a crossing point of the lattice on the one side base 355. The one side base 355 may maintain the vacuum space inside of the plate members 10 and 20 by contacting inner surfaces of the plate members 10 and 20. The column 356 may provide a portion of the bar 31 to maintain an interval between the plate members 10 and 20.

A mesh end of the lattice structure constituting the one base 351 may have a male and female coupling structure for coupling different partial plates 351 to each other. For example, upper and left edges may have a male coupling structure, and right and lower edges may have a female coupling structure. Extension lines of arrows in the drawings indicate edges having the same coupling structure.

Figure 11:
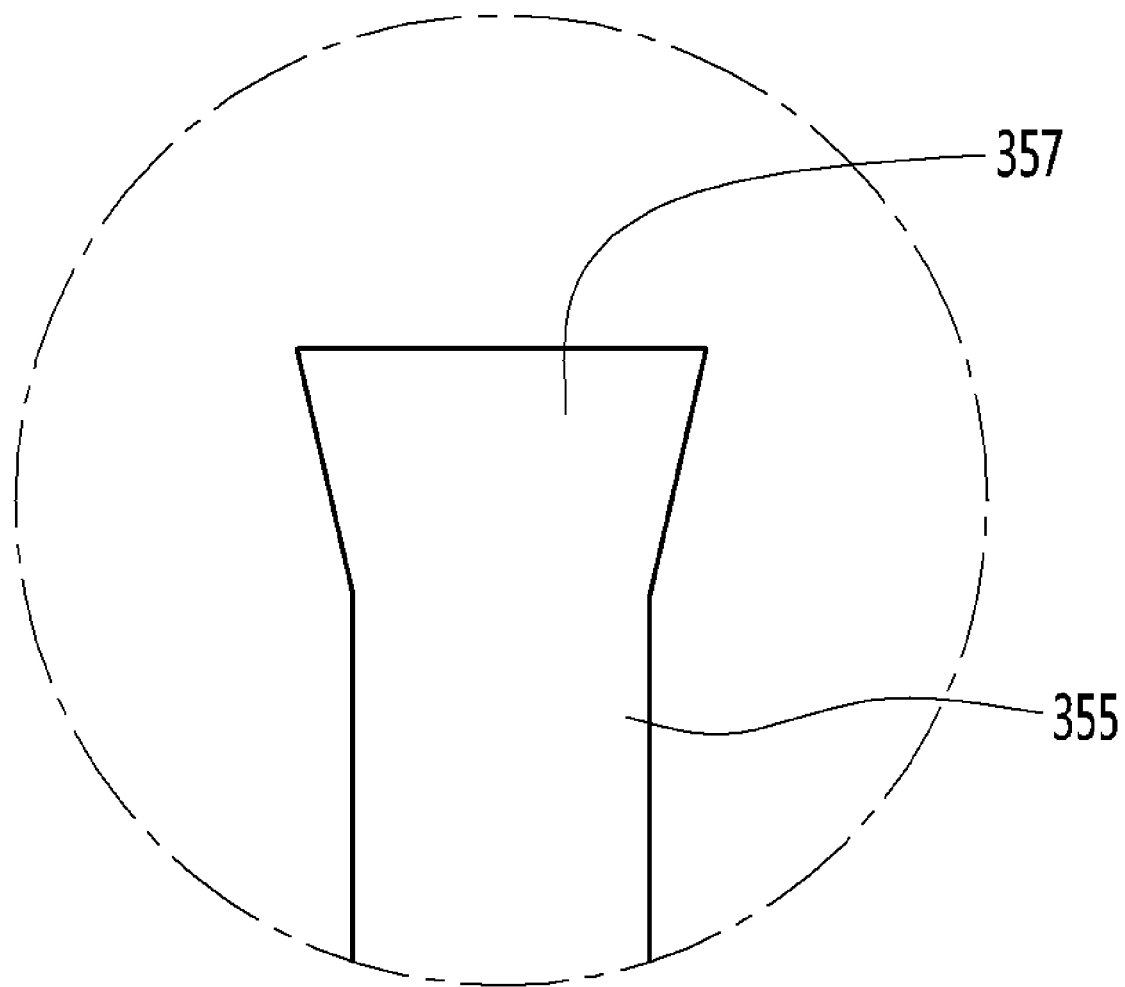
FIG. 11 is an enlarged view of a portion A of FIG. 10.
Figure 12:
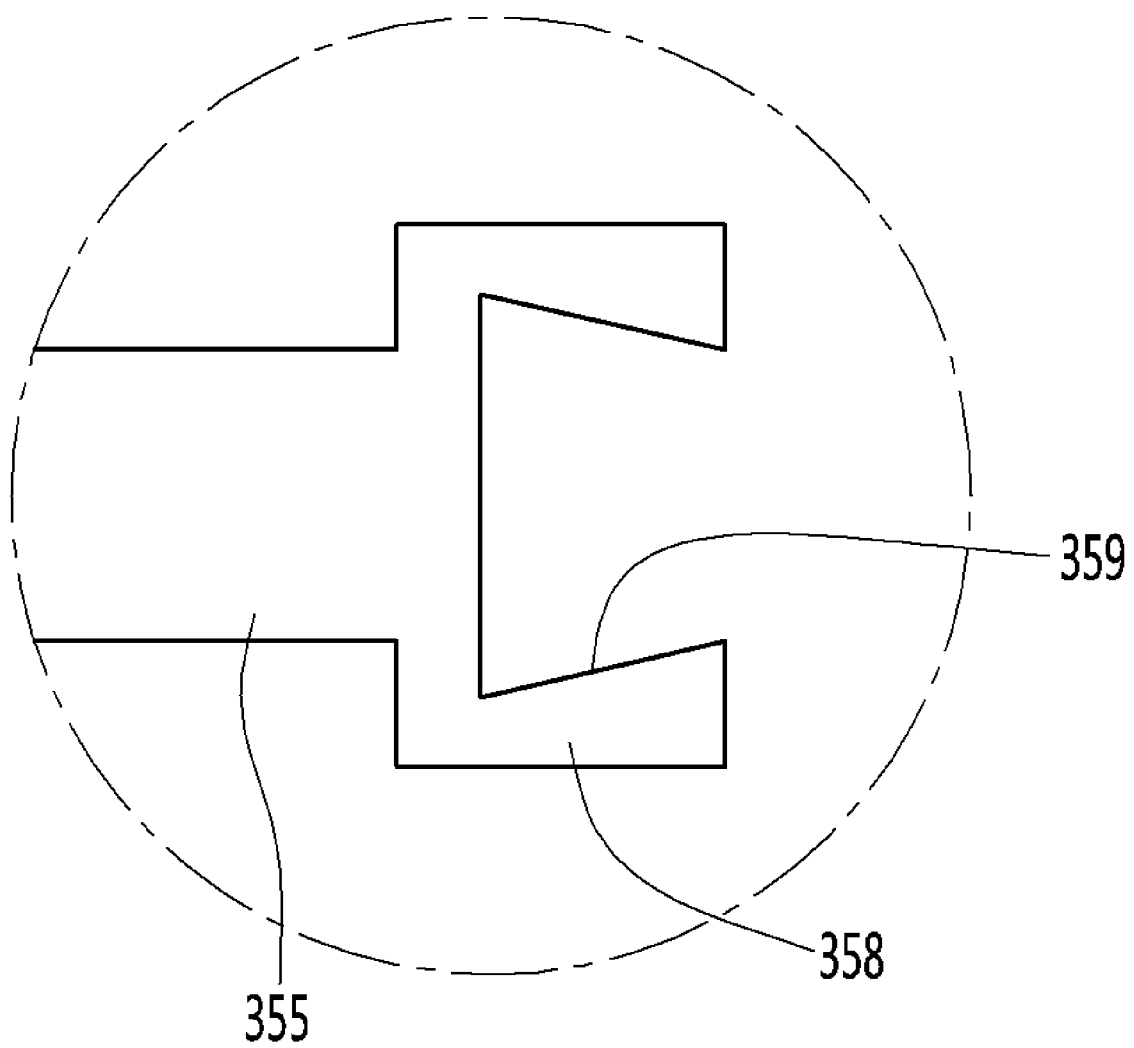
FIG. 12 is an enlarged view of a portion B of FIG. 10.

FIG. 11 is an enlarged view of a portion A of FIG. 10. FIG. 12 is an enlarged view of a portion B of FIG. 10.

Referring to FIGS. 11 and 12, the male coupling structure (see FIG. 11) has an insertion part 357 at an end of a branch that provides the lattice of one base (base) 355. The insertion part 357 may be provided in a structure in which the end of the branch is extended. The male coupling structure (see FIG. 12) may be provided with a holding part 358 which is held at the end of the one base 355. A holding part 358 may be provided with a recess 359 at the end of the branch. The shape of the recess 359 may be provided in a shape corresponding to the insertion part 357. The insertion part 357 may be inserted into the recess 359.

The male coupling structure of the adjacent partial plate is vertically aligned with the female coupling structure of the other partial plate, and the insertion part 357 and the recess 359 are used as a reference for vertical alignment. Thereafter, when the insertion part 357 is moved in the vertical direction to the recess 359, coupling between the partial plates may be completed. The vertical direction may be a direction perpendicular to the plane of a corresponding plate member.

For example, right and lower side male coupling structures of the first partial plate 351 are coupled to the male coupling structure of the fourth partial plate 354 and the male coupling structure of the second partial plate 352. This coupling structure may be the same for other partial plates.

The male coupling structure and the female coupling structure of the partial plates allow for use of as small a quantity of resin as possible and are intended to enable coupling while reducing size as much as possible. Movement in one direction, i.e., up and down direction, is permitted to be coupled. However, movement in the two-dimensional direction, i.e., in the area direction is not allowed, so that the coupling is performed.

The male coupling structure and the female coupling structure do not need to be completely fitted to each other, e.g., they are coupled to each other. This is because not only the movement in the two-dimensional direction but also the vertical movement of the respective partial plates is permitted, but the vertical movements are fixed later by a separate member. Also, this is because of characteristics of resin having poor liquid fluidity, it is necessary to make it easy to couple slight loose coupling through movement in the up and down direction through the coupling. That is, this is because a numerical value of the coupling structure for press-fitting may lead to damage to the partial plate at the time of coupling.

This structure reduces an amount of resin as much as possible to reduce an amount of outgasing so as not to cause the limitation in vacuum maintenance of the vacuum space part and to prevent molding of the male coupling structure and the female coupling structure from being difficult even if the resin having poor formability is used.

Figure 13:
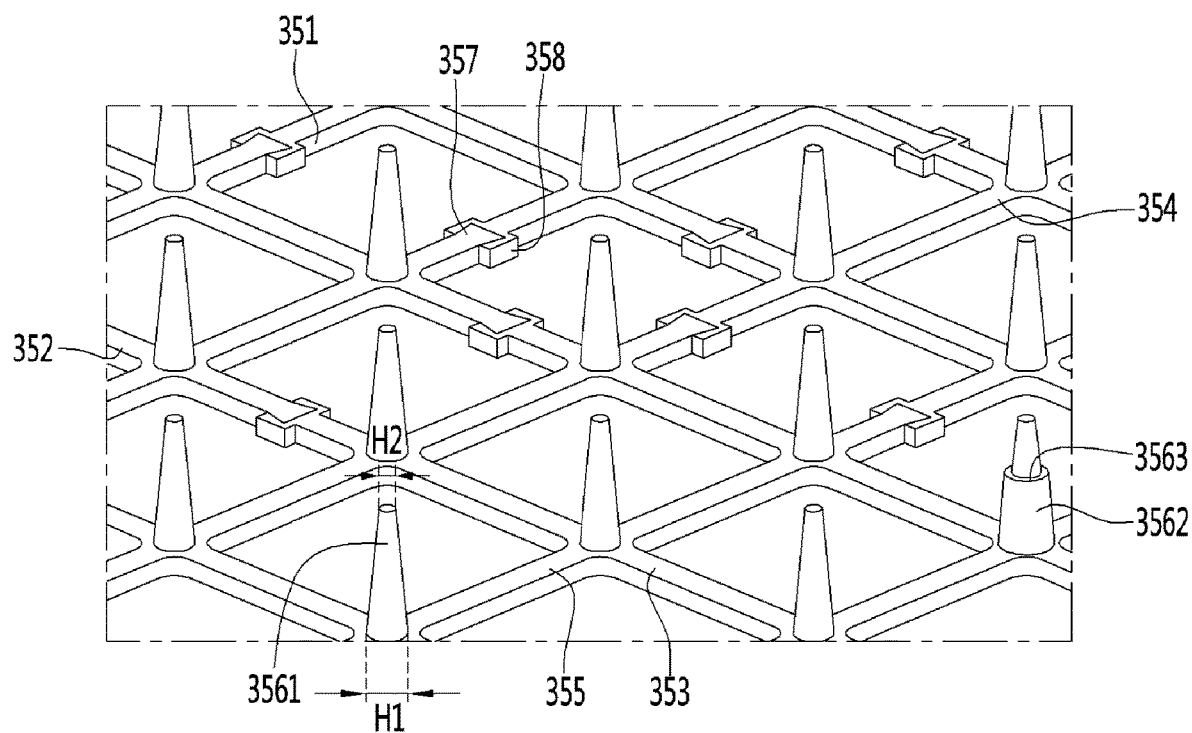
FIG. 13 is an enlarged view of a portion C of FIG. 9.

FIG. 13 is an enlarged view of a portion C of FIG. 9. Referring to FIG. 13, in the case of the embodiment, all of the partial plates are in contact with each other, and the partial plates have the same shape. The insertion part 357 is fixed to the holding part 358 in a vertical direction. The holding parts 358 and 357 provided on the respective partial plates 351, 352, 353 and 354 are coupled to each other so that movement of the partial plates in the two-dimensional direction, i.e., one support plate 350 may provide a large area. The area of the one side support plate 350 may be achieved by coupling a necessary number of partial plates. When varying the size and number of the partial plates, the sizes of the one side support plates 350 having various shapes and sizes may be obtained.

The column 356 provided at the intersection of the respective lattices constituting the one base 355 may include two types. For example, the columns 356 may include a spacing (first) column 3561 that functions to maintain an interval between the plate members 10 and 20 and a support (second) column 3562 that supports the radiation resistance sheet 32.

The spacing column 3561 is coupled to a groove (see reference numeral 373 in FIG. 16) of the other support plate (see reference numeral 370 in FIG. 14) to maintain the interval between the plate members 10 and 20. In order to facilitate coupling with the groove 373 and to ensure moldability using liquid resin, the spacing column 3561 is provided with a diameter H1 at a lower end of the spacing column, which is greater than a diameter H2 at an upper end. Although the cross-sectional shape of the spacing column 3561 may not be circular, the cross-sectional size of the upper end may be small. However, the cross-sectional shape of the spacing column 3561 may be provided in a circular shape in order to secure the forming shape of the spacing columns 3561 and the coupling between the spacing columns 3561 and the groove 373.

As in the case of the spacing column 3561, the support column 3562 has a smaller cross-sectional size of the support column 3562 toward the upper end for securing coupling and moldability. Further, for supporting the radiation resistance sheet 32, the support column 3562 may be provided with a stepped protrusion 3563. A plurality of support columns 3562 may be provided at predetermined intervals to stably support the radiation resistance sheet 32. The action of the support column 3562 will be described in more detail below.

As has been described above, movement of the one side support plate 350 in the vertical direction is restricted while the one side support plate 350 is free to move in the vertical direction. Therefore, a configuration for limiting the vertical movement of each partial plate may be provided. The supporting unit 30 may be in contact with the inner surface of the plate member to support the interval of the plate members 10 and 20. When the supporting unit is in contact with the plate member, point contact may provide a stable supporting force as compared with line contact. Therefore, a configuration may be provided such that the column 356 does not directly contact the inner surface of the plate member.

In order to achieve this object, another side support plate 370 corresponding to the one side support plate 350 may be further provided. Hereinafter, the one side support plate 350 and the other side support plate 370 will be described.

Figure 14:
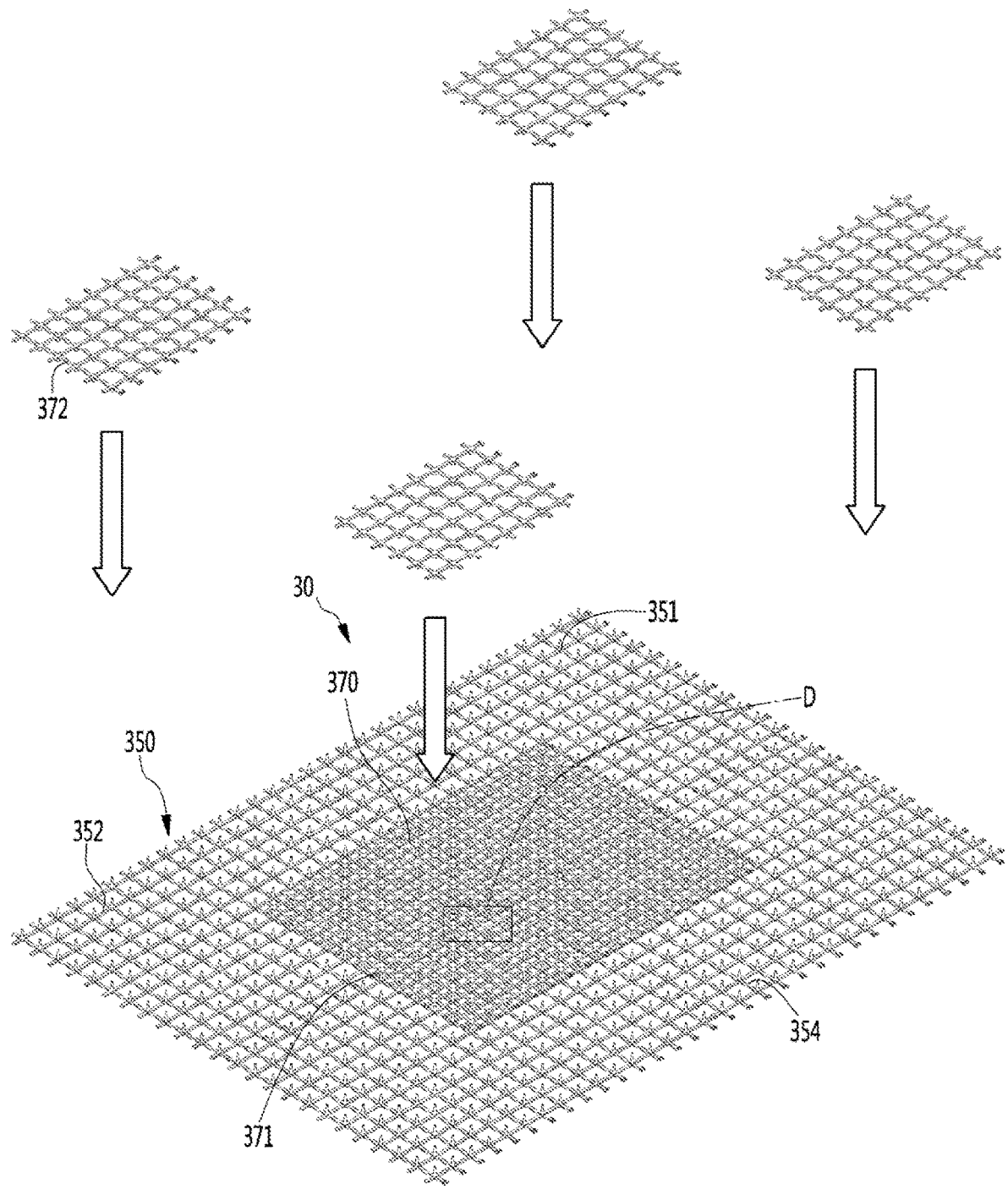
FIG. 14 is a view for explaining coupling between one side support plate and the other side support plate.

FIG. 14 is a view for explaining coupling between one side support plate and the other side support plate. Referring to FIG. 14, at least two of the partial plates are coupled to each other to provide the one side support plate 350. The one side support plate 350 is restricted to separate in the area (lateral) direction, but the upward and downward (vertical) movement is not restricted. In order to restrict vertical separation of the one side support plate 350 and securely secure the interval of the plate members 10 and 20 while more strongly coupling the one side support plate 350 in the direction of the area separation, a support plate 370 is provided. The other side support plate 370 may be coupled to the one side support plate 350.

The other side support plate 370 may be understood as a member for supporting the plate member opposite to the plate member supported by the one side support plate 350. The other side support plate 370 may be used as it is with a standardized other side plate member having a predetermined size, or a standardized side plate member may be separated at a proper position by cutting, for example. Therefore, it may be understood that the other plate member has the same configuration, but the applied area is different.

Of course, the other side plate member as a unit having an area corresponding to the one side support plate 350 may be provided, but a same constitution as the embodiment may be presented in order to maximize the effect as a part.

In an embodiment, the other side plate member of the original size which is not cut is formed at a center portion of the one side support plate 350 at which the partial plates 351, 352, 353 and 354 are coupled to each other as overlapping other side plates (boundary support plate) 371. In this case, the other plate member is coupled to overlap a boundary of the different partial plates, thereby enhancing a binding force between the respective partial plates and performing the function of restricting movement in the area direction. In this case, it is needless to say that the function of restricting the movement of the partial plate in the vertical direction and the function of maintaining the interval of the plate members 10 and 20 are performed.

In other words, the boundary of each partial plate constituting one support plate and the other plate member constituting the other support plate (which may include both of the overlapping other plate and the single other plate) cross each other and do not overlap each other desirable. If the boundaries overlap each other, there is a possibility that the members of the respective support plates, i.e., the partial plate and the other plate member are separated from each other independently or together.

The other plate member may be provided in the same shape as the overlapping plate 371 coupled to the center portion of the one side support plate 350. The other plate member may be coupled to the single partial plate without overlapping at least two of the partial plates. In this case, a portion of the other side plate member may be referred to as a single other side plate (secondary support plate) 372. In this case, it is needless to say that the function of restricting the movement of the partial plate in the vertical direction and the function of maintaining the interval of the plate members 10 and 20 are performed. However, it is not possible to perform the action of restricting movement of each partial plate in the direction of the area and enhancing the binding force between the partial plates.

In the case of an embodiment, four other plate members 370 having the same area as the partial plates 351, 352, 353, and 354 may be used. One of the four support plates 350 is coupled to a center of the other support plate 350 as the overlapping second side plate 371, and two of the four plates are cut horizontally and vertically and coupled as the overlapping second side plate 371 to correspond to the center of the four edges of the other side support plate 350. Among these, the plate which is separated horizontally and vertically is omitted in order to prevent the drawing from being complicated. One of the four plates may be quadrupled and coupled as a single other plate 372 corresponding to the vertex portion of the other support plate 350.

As described above, the other side plate member may include a larger-sized other side plate member and a small-sized side plate member derived from the standardized largest other side plate by separation and transmission. According to this configuration, it is possible to provide the other side support plate of various shapes and structures without providing a separate second side plate member according to the shape and shape of the vacuum adiabatic body.

The arrangement of the partial plate and the other plate member may be an embodiment, and those skilled in the art may suggest other embodiments included in the scope of the same concept.

Figure 15:
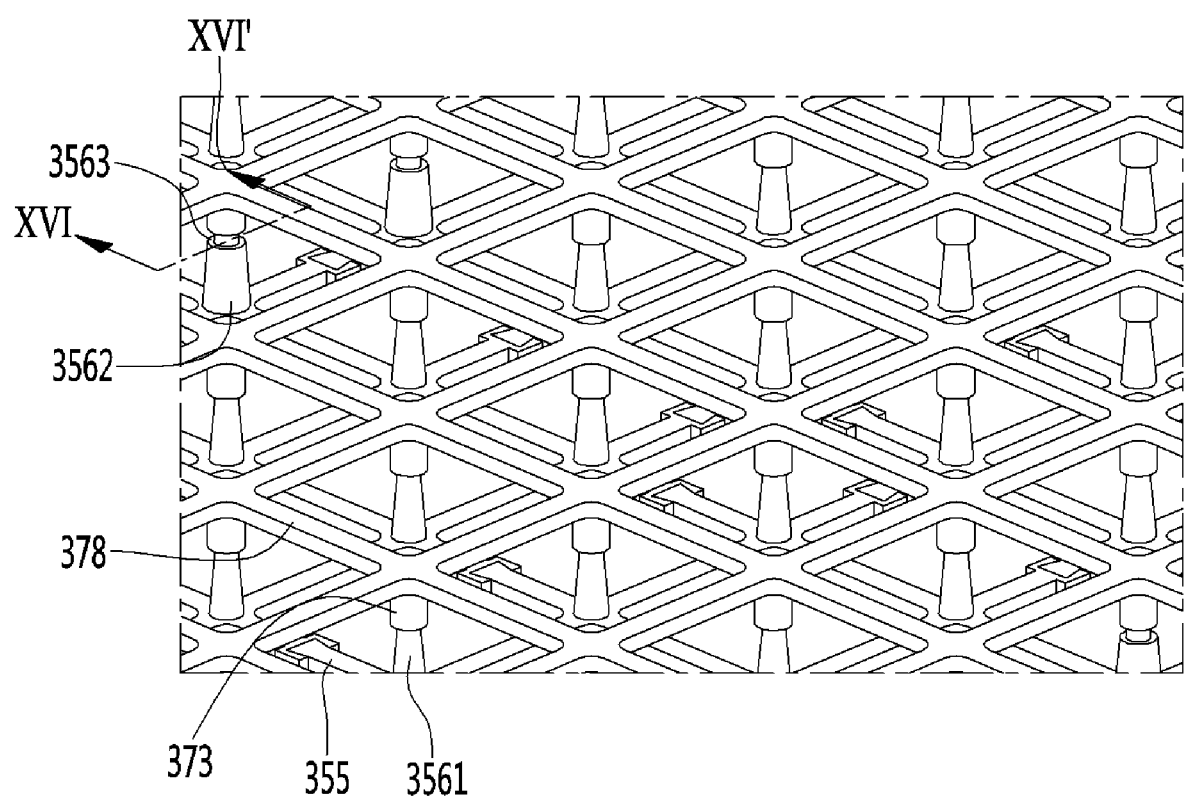
FIG. 15 is an enlarged view of a portion D of FIG. 14.

FIG. 15 is an enlarged view illustrating a portion D of FIG. 14. Referring to FIG. 15, the other side support plate 370 has a lattice-shaped other side base 378 like the one side support plate 350 and a groove 373 which is coupled to the column 356 at the intersection of the lattice of the other side base 378.

A radiation resistance sheet 32 may be supported between the stepped protrusion 3563 and the groove 373. Upper and lower positions of the radiation resistance sheet 32 may be restrained between the groove 373 and the end of the stepped protrusion 3563 and the movement in the direction of the area may be restricted by the support columns 3562.

Figure 16:
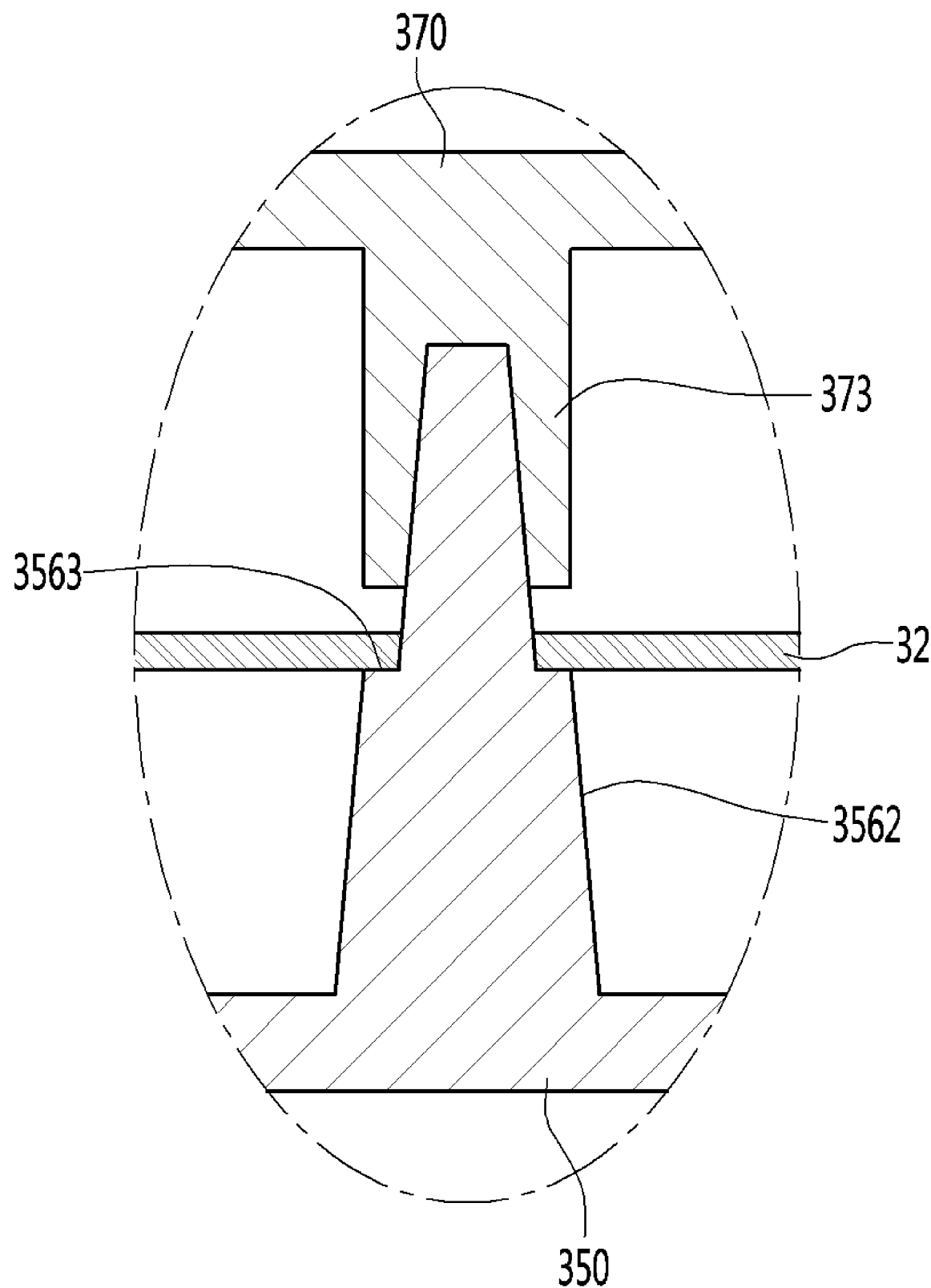
FIG. 16 is a cross-sectional view taken along line XVI-XVI' of FIG. 15.

FIG. 16 is a cross-sectional view taken along line XVI-XVI' of FIG. 15. Referring to FIG. 16, a support position of the radiation resistance sheet 32 in the vertical direction is restricted between the stepped protrusion 3563 and the groove 373. For this purpose, the size of the hole provided in the radiation resistance sheet 32 is smaller than the size of the end of the stepped protrusion 3563 and the size of the end of the groove 373.

The vacuum adiabatic body may be manufactured in various sizes, and shapes. For example, the vacuum adiabatic body provided on the wall of the large refrigerator will be provided in a large plane, and the vacuum adiabatic body provided on the wall of the small refrigerator may be provided in a small plane.

It is not advantageous to manufacture the respective support plates in order to cope with refrigerator sizes of various shapes as described above because the cost of the products increases. This is because part stocks are increasing due to inability of parts to be shared, and it is difficult to procure parts in the right place in response to demand. In order to cope with this limitation, the present inventor has proposed to utilize the partial plates 351, 352, 353, and 354, but it has been difficult to cope with vacuum adiabatic bodies having various sizes by the partial plate concept alone.

Figure 17:
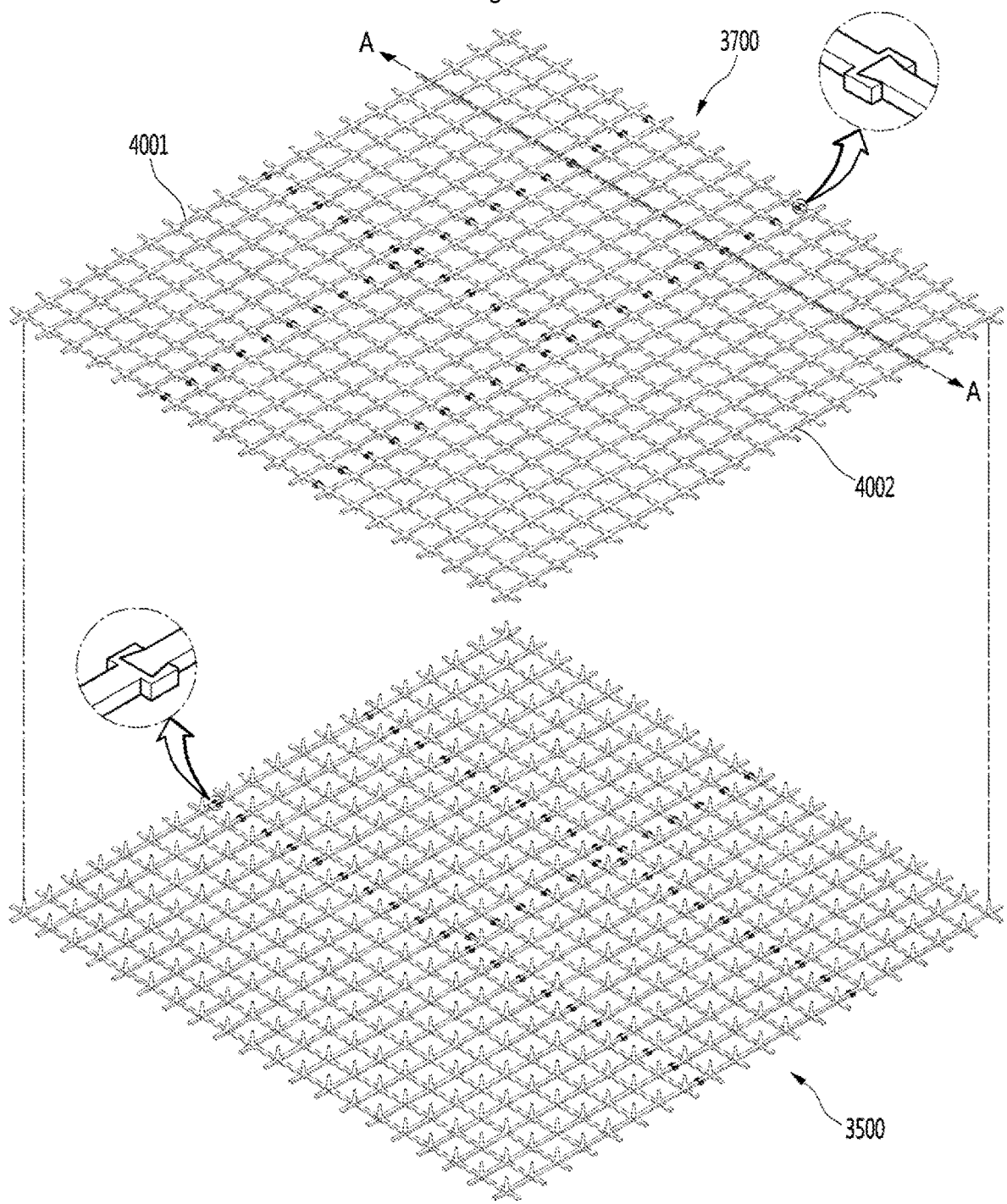
FIG. 17 is a view of a supporting unit according to another embodiment.

FIG. 17 is a view of a supporting unit according to another embodiment. Referring to FIG. 17, the one side (first) support plate 3500 and the other side (second) support plate 3700 may be manufactured as two kinds of partial plates. The partial plate may include a first type partial plate 4001 having a lateral length ratio of 3:5 and a second type partial plate 4002 having a lateral length ratio of 4:10. Length ratios of the partial plates 4001 and 4002 may vary, but are merely examples. In addition, although support plates having a length ratio of 1:1 in the left and right (lateral) directions are assumed in the drawings, the embodiment is not limited thereto, and it is possible to provide a support plate having various shapes and sizes according to a combination of two partial plates.

The one side support plate 3500 and the other side support plate 3700 may be provided in a state of being rotated by 90 degrees from each other. Due to such a configuration, it is possible to prevent lowering of a coupling force at a portion at which the partial plate is connected.

The coupling between the one side support plate 3500 and the partial plate placed inside of the other side support plate 3700 may be applied as it is in the embodiments already described.

In this embodiment, when a virtual line A-A is drawn in a direction along edges of the one side support plate 3500 and the other side support plate 3700, the following features are revealed. In the figures, imaginary lines are considered on the other support plate. Similar results may be obtained for one side support plate.

First, at least two partial plates in the line through which the imaginary line passes are the same. In an embodiment, there are two first type partial plates 4001. This may have a technical meaning to increase commonality of parts. That is, as at least two identical partial plates are used, mass production of the same partial plate may be induced.

Second, all of the partial plates are not the same in the line through which the imaginary line passes. In the embodiment, not only the first type partial plate 4001 but also the second partial plate 4002 were used. This is a technical idea necessary for obtaining one side or the other side support plate having various shapes and areas.

Third, at least two kinds of partial plates are used in the line through which the imaginary line passes. According to this, it is possible to provide a more various one side or the other side support plate, so that it is possible to cope with vacuum adiabatic body of various shapes and sizes. By using the two partial plates, it is expected that vacuum adiabatic bodies having various shapes and sizes at present may be manufactured while achieving commonality of the partial plates. According to the present embodiment, it may be seen that the cost is reduced by more actively sharing components with respect to vacuum heat insulating bodies of various shapes and sizes.

Hereinafter, vacuum pressure of the vacuum adiabatic body will be described.

Figure 18:
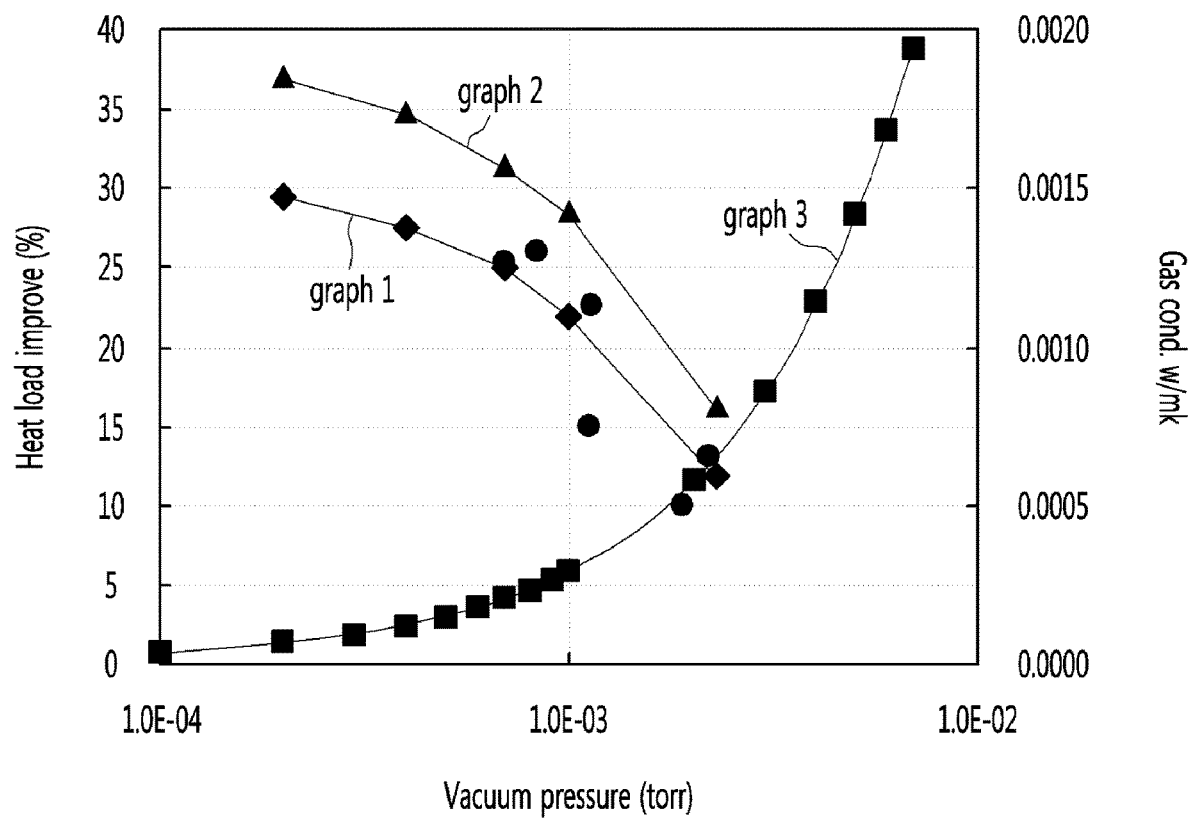
FIG. 18 illustrates graphs showing changes in adiabatic performance and changes in gas conductivity with respect to vacuum pressures by applying a simulation.

FIG. 18 illustrates graphs showing changes in adiabatic performance and changes in gas conductivity with respect to vacuum pressures by applying a simulation. Referring to FIG. 18, it may be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving adiabatic performance. However, it may be seen that a degree of improvement of the adiabatic performance is gradually lowered. Also, it may be seen that, as the vacuum pressure is decreased, gas conductivity (Graph 3) is decreased. However, it may be seen that, although the vacuum pressure is decreased, a ratio at which the adiabatic performance and the gas conductivity are improved is gradually lowered. Therefore, the vacuum pressure is decreased as low as possible. However, it takes a long time to obtain excessive vacuum pressure, and much cost is consumed due to excessive use of a getter. In the embodiment, an optimal vacuum pressure is proposed from the above-described point of view.

Figure 19:
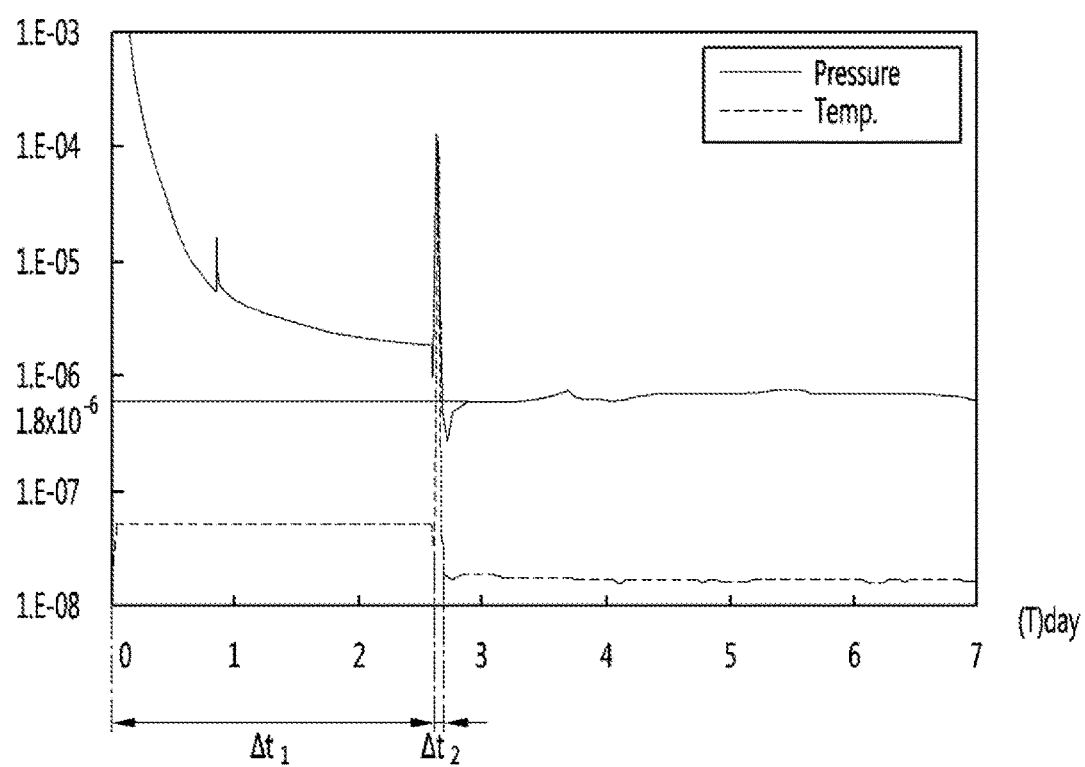
FIG. 19 is a graph illustrating results obtained by observing a time and a pressure in a process of exhausting the inside of the vacuum adiabatic body when a supporting unit is used.

FIG. 19 is a graph illustrating results obtained by observing a time and a pressure in a process of exhausting the inside of the vacuum adiabatic body when a supporting unit is used. Referring to FIG. 19, in order to create the vacuum space part 50 to be in the vacuum state, a gas in the vacuum space part 50 is exhausted by a vacuum pump while evaporating a latent gas remaining in parts of the vacuum space part 50 through baking. However, if the vacuum pressure reaches a certain level or more, there exists a point at which the level of the vacuum pressure is not increased any more (ΔT1). After that, the getter is activated by disconnecting the vacuum space part 50 from the vacuum pump and applying heat to the vacuum space part 50 (ΔT2). If the getter is activated, the pressure in the vacuum space part 50 is decreased for a certain period of time, but then normalized to maintain a vacuum pressure of a certain level. The vacuum pressure that maintains the certain level after activation of the getter is approximately 1.8×10-6 Torr.

In the embodiment, a point at which the vacuum pressure is not substantially decreased any more even though the gas is exhausted by operating the vacuum pump is set to a lowest limit of the vacuum pressure used in the vacuum adiabatic body, thereby setting a minimum internal pressure of the vacuum space part 50 to 1.8×10-6 Torr.

Figure 20:
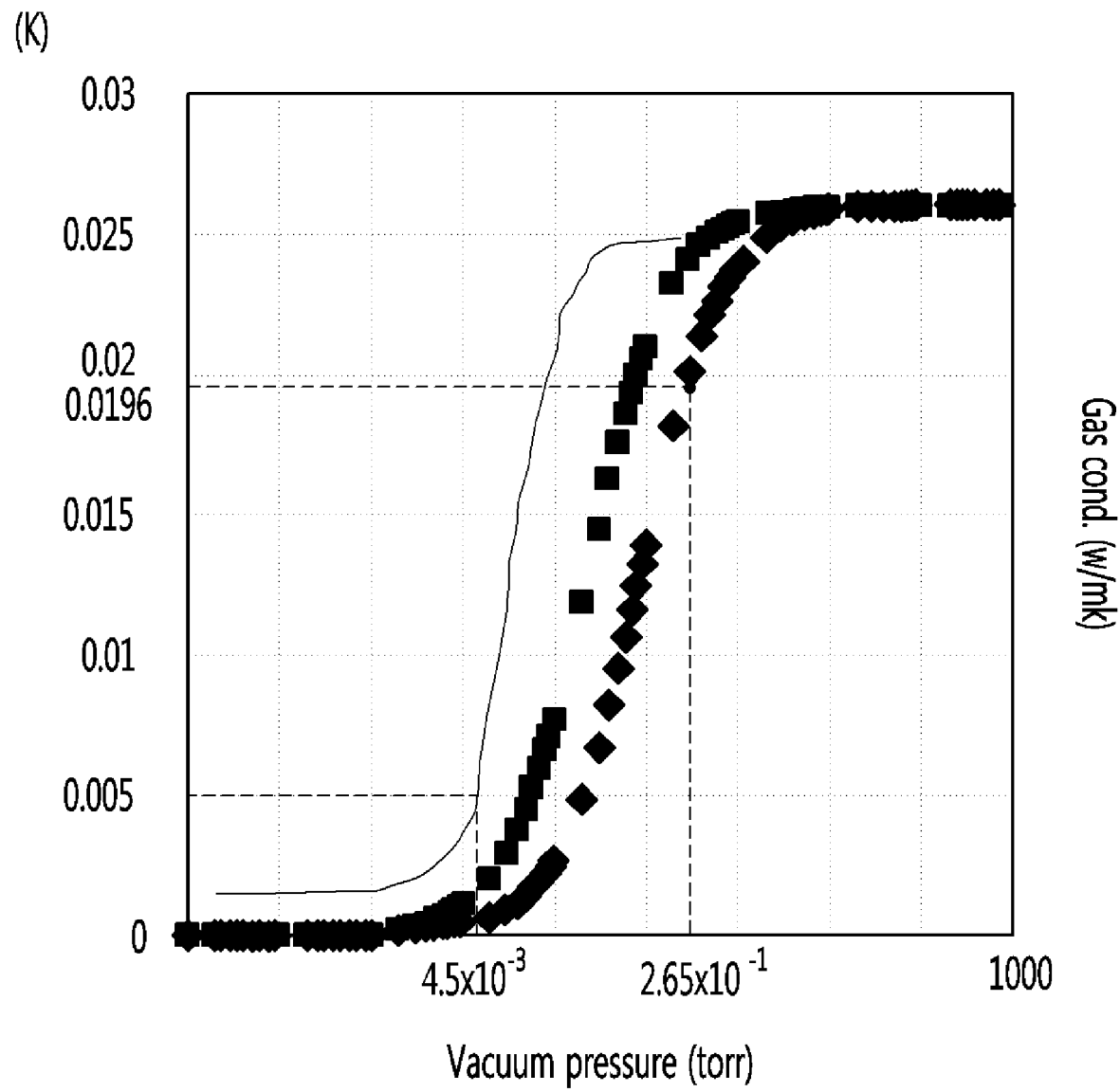
FIG. 20 is a graph illustrating results obtained by comparing a vacuum pressure with gas conductivity.

FIG. 20 is a graph obtained by comparing a vacuum pressure with gas conductivity. Referring to FIG. 20, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside of the vacuum space part 50, the gap is a distance between the radiation resistance sheet 32 and the plate member adjacent thereto. When the radiation resistance sheet 32 does not exist inside of the vacuum space part 50, the gap is a distance between the first and second plate members.

It was seen that, as the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. It was seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous material are provided together in the vacuum space part, a vacuum pressure may be created and used, which is in the middle between the vacuum pressure when only the supporting unit is used and the vacuum pressure when only the porous material is used.

In the description of embodiments, a part for performing the same action in each embodiment of the vacuum adiabatic body may be applied to another embodiment by properly changing the shape or dimension of foregoing another embodiment. Accordingly, still another embodiment may be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

The vacuum adiabatic body proposed in embodiments may be applied to refrigerators. However, the application of the vacuum adiabatic body is not limited to the refrigerators, and may be applied in various apparatuses, such as cryogenic refrigerating apparatuses, heating apparatuses, and ventilation apparatuses.

According to embodiments, the vacuum adiabatic body may be industrially applied to various adiabatic apparatuses. The adiabatic effect may be enhanced, so that it is possible to improve energy use efficiency and to increase the effective volume of an apparatus.

The invention claimed is:

1. A vacuum adiabatic body, comprising:
   a first plate defining at least a portion of a wall for a first space;
   a second plate defining at least a portion of a wall for a second space having a second temperature different from a first temperature of the first space;
   a sealing that seals the first plate and the second plate to provide a third space having a third temperature between the first temperature and the second temperature, wherein the third space is a vacuum space;
   a support that maintains the third space;
   a heat resistance unit that reduces heat transfer between the first plate and the second plate; and
   an exhaust port through which a gas of the third space is exhausted, wherein the support comprises:
      a first support plate formed by coupling at least two partial plates to each other to support one of the first plate or the second plate; and
      a second support plate that supports the other one of the first plate or the second plate, wherein each of the first and second support plates includes an opening through which a space between the first and second support plates is exposed to surfaces of the first and second plates.

2. The vacuum adiabatic body according to claim 1, wherein the at least two partial plates extend along an extension direction of the first plate or the second plate.

3. The vacuum adiabatic body according to claim 2, wherein adjacent edges of one of the at least two partial plates has a male structure and the other has a female structure.

4. The vacuum adiabatic body according to claim 2, wherein the at least two partial plates are restricted in movement in a first direction, but are not restricted in movement in a second direction.

5. The vacuum adiabatic body according to claim 1, wherein the at least two partial plates have a same shape.

6. The vacuum adiabatic body according to claim 1, wherein each partial plate comprises:
   a base provided as a lattice structure; and
   a plurality of columns provided at each intersection of the lattice structure.

7. The vacuum adiabatic body according to claim 6, wherein the heat resistance unit comprises at least one radiation resistance sheet that resists radiation heat transfer in the third space, and wherein each of the plurality of columns comprises:
   at least one first column that supports the at least one radiation resistance sheet; and
   at least one second column that maintains an interval between the first plate and the second plate.

8. The vacuum adiabatic body according to claim 6, wherein the second support plate comprises:
   a base having a lattice shape; and
   a plurality of grooves provided at each intersection of the lattice shape and into which the plurality of columns of the first support plate is inserted and coupled, respectively.

9. The vacuum adiabatic body according to claim 1, wherein the second support plate comprises at least two plates each having a plate shape.

10. The vacuum adiabatic body according to claim 9, wherein the second support plate further comprises:
   a boundary support plate coupled to one of the at least two partial plates of the first support plate at a boundary between the at least two partial plates of the first support plate; and
   a secondary support plate coupled to one of the at least two partial plates at an area which does not include the boundary between the at least two partial plates.

11. The vacuum adiabatic body according to claim 9, wherein the second support plate further comprises:
a largest standardized size support plate; and
at least one smaller support plate corresponding to one portion of the largest standardized size support plate.

12. The vacuum adiabatic body according to claim 9, wherein the second support plate comprises an overlapping support plate that couples boundaries of the at least two partial plates of the first support plate.

13. A refrigerator, comprising:
a main body providing an internal space in which goods are stored;
a door configured to open and close the internal space; and
a refrigeration cycle configured to supply cold air into the internal space, the refrigeration cycle comprises:
a compressor that compresses a refrigerant;
a condenser that condenses the compressed refrigerant;
an expansion valve that expands the condensed refrigerant; and
an evaporator that evaporates the expanded refrigerant to dissipate heat, wherein the door or the main body comprises a vacuum adiabatic body, and the vacuum adiabatic body comprises:
a first plate defining at least a portion of a wall for the internal space;
a second plate defining at least a portion of a wall for an external space of the refrigerator;
a sealing that seals the first plate and the second plate to provide a vacuum space having a temperature between a temperature of the internal space and a temperature of the external space;
a support that maintains the vacuum space;
a heat resistance unit that reduces heat transfer between the first plate and the second plate; and
an exhaust port through which a gas of the vacuum space is exhausted, wherein the support comprises:
a first support plate provided by coupling at least two partial plates to each other to support one of the first plate or the second plate, the at least two partial plates of the first support plate being placed side by side on the one of the first plate or the second plate;
a second support plate that supports the other one of the first plate or the second plate and comprising at least two support plates which are separated from each other, the at least two support plates of the second support plate being placed side by side on the other one of the first plate or the second plate;
a first protrusion configured to protrude from the at least two partial plates towards the at least two support plates; and
a second protrusion configured to protrude from the at least two support plates towards the at least two partial plates and to be coupled to the first protrusion.

14. The refrigerator according to claim 13, wherein the at least two partial plates have a same shape.

15. A vacuum adiabatic body, comprising:
a first plate defining at least a portion of a wall for a first space;
a second plate defining at least a portion of a wall for a second space having a second temperature different from a first temperature of the first space;
a sealing that seals the first plate and the second plate to provide a third space having a third temperature between the first temperature and the second temperature, wherein the third space is a vacuum space;
a support that maintains the third space;
a heat resistance unit that reduces heat transfer between the first plate and the second plate; and
an exhaust port through which a gas of the third space is exhausted, wherein the support comprises a first support plate and a second support plate, which respectively support the first plate and the second plate, and wherein when a virtual line is drawn from a first edge of one of the first support plate or the second support plate in a direction toward a second edge thereof, the virtual line passes through at least three partial plates.

16. The vacuum adiabatic body according to claim 15, wherein at least one of the at least three partial plates has a shape different from a shape of another of the partial plates along the virtual line.

17. The vacuum adiabatic body according to claim 15, wherein at least two partial plates comprise two kinds of partial plates different from each other provided along the virtual line.

18. The vacuum adiabatic body according to claim 15, wherein at least one of the first support plate or the second support plate is provided by coupling at least two plates that are separated in a vertical direction with respect to a plane of the corresponding plate.

19. The vacuum adiabatic body according to claim 15, wherein when a virtual line is drawn in a same direction as an edge, in both the first support plate and the second support plate, the virtual line passes through at least two partial plates, and at least two of the at least three partial plates have a same shape.

20. The vacuum adiabatic body according to claim 15, wherein a first boundary of the first support plate crosses a second boundary of the second support plate, wherein the first support plate includes at least two partial plates that provide the first boundary, and the second support plate includes at least two partial plates that provide the second boundary.

21. The vacuum adiabatic body according to claim 15, wherein at least two of the at least three partial plates have a same shape.

22. A vacuum adiabatic body, comprising:
a first plate;
a second plate;
a vacuum space provided between the first plate and the second plate;
a support configured to maintain a distance between the first plate and second plate, the support being disposed next to or adjacent to the first plate and comprising:
a first support plate formed by coupling at least two partial plates to each other to support one of the first plate or the second plate; and
a second support plate that supports the other one of the first plate or the second plate, wherein the second support plate comprises:
a first partial plate coupled to the first support plate to cover a boundary between the at least two partial plates and positioned at a center of the first support plate; and
a second partial plate coupled to the first support plate at an area which does not include the boundary between the at least two partial plates and positioned at an edge of the first partial plate.

23. A vacuum adiabatic body, comprising:
a first plate;
a second plate;

a vacuum space provided between the first plate and the second plate;
a support configured to maintain a distance between the first plate and second plate, the support being disposed next to or adjacent to the first plate and comprising:
a first support plate formed by coupling at least two partial plates to each other to support one of the first plate or the second plate;
a second support plate that supports the other one of the first plate or the second plate; and
at least one column provided between the first support plate and the second support plate and comprising:
   a first part provided at the first support plate and having a stepped protrusion to support the at least one radiation resistance sheet; and
   a second part configured to extend from the first part towards the second support plate and to be inserted into a groove of the second support plate.

\* \* \* \* \*